(12) United States Patent
Brennan et al.

(10) Patent No.: US 11,518,146 B2
(45) Date of Patent: Dec. 6, 2022

(54) METHOD OF FORMING A VEHICLE INTERIOR SYSTEM

(71) Applicant: CORNING INCORPORATED, Corning, NY (US)

(72) Inventors: Michael Timothy Brennan, Painted Post, NY (US); Atul Kumar, Horseheads, NY (US); Yawei Sun, Elmira, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 16/512,657

(22) Filed: Jul. 16, 2019

(65) Prior Publication Data

US 2020/0016806 A1 Jan. 16, 2020

Related U.S. Application Data

(60) Provisional application No. 62/698,506, filed on Jul. 16, 2018.

(51) Int. Cl.
| | | |
|---|---|---|
| *B29C 45/14* | (2006.01) | |
| *B32B 17/10* | (2006.01) | |
| *B29K 709/08* | (2006.01) | |
| *B29L 31/30* | (2006.01) | |

(52) U.S. Cl.
CPC ........ *B32B 17/10* (2013.01); *B29C 45/14434* (2013.01); *B29K 2709/08* (2013.01); *B29L 2031/3005* (2013.01); *B32B 2250/02* (2013.01); *B32B 2605/006* (2013.01)

(58) Field of Classification Search
None
See application file for complete search history.

(56) References Cited

U.S. PATENT DOCUMENTS

| | | |
|---|---|---|
| 2,068,030 A | 1/1937 | Lieser |
| 2,608,030 A | 8/1952 | Jendrisak |
| 3,197,903 A | 8/1965 | Walley |

(Continued)

FOREIGN PATENT DOCUMENTS

| | | |
|---|---|---|
| CN | 1587132 A | 3/2005 |
| CN | 1860081 A | 11/2006 |

(Continued)

OTHER PUBLICATIONS

International Search Report and Written Opinion of the European International Searching Authority; PCT/US2019/040486; dated Oct. 18, 2019; 11 Pgs.

(Continued)

*Primary Examiner* — Edmund H Lee

(57) ABSTRACT

Embodiments of a vehicle interior system and methods for forming the same are disclosed. A glass substrate is bent to a curved shape within a mold cavity, and a liquid polymer material is delivered to the mold and is in contact with the curved glass substrate. The liquid polymer is solidified to form a polymer frame that engages the bent glass substrate, and the engagement between the frame and the glass substrate holds the glass substrate in the bent shape. The temperature of the glass substrate during the bending process and formation of the frame are maintained below the glass transition temperature of the glass substrate.

20 Claims, 6 Drawing Sheets

(56) References Cited

U.S. PATENT DOCUMENTS

| | | | |
|---|---|---|---|
| 3,338,696 A | 8/1967 | Dockerty | |
| 3,582,456 A | 5/1971 | Stolki | |
| 3,682,609 A | 8/1972 | Dockerty | |
| 3,753,840 A | 8/1973 | Plumat | |
| 3,778,335 A | 12/1973 | Boyd | |
| 3,790,430 A | 2/1974 | Mochel | |
| 3,799,817 A | 3/1974 | Laethem | |
| 4,147,527 A | 4/1979 | Bystrov et al. | |
| 4,238,265 A | 12/1980 | Deminet | |
| 4,445,953 A | 4/1984 | Hawk | |
| 4,455,338 A | 6/1984 | Henne | |
| 4,508,556 A * | 4/1985 | Bennett | C03B 23/03 65/106 |
| 4,859,636 A | 8/1989 | Aratani et al. | |
| 4,899,507 A * | 2/1990 | Mairlot | B32B 17/10036 52/222 |
| 4,969,966 A | 11/1990 | Norman | |
| 4,985,099 A | 1/1991 | Mertens et al. | |
| 5,108,480 A | 4/1992 | Sugiyama | |
| 5,154,117 A | 10/1992 | Didelot et al. | |
| 5,173,102 A | 12/1992 | Weber et al. | |
| 5,245,468 A | 9/1993 | Demiryont et al. | |
| 5,250,146 A | 10/1993 | Horvath | |
| 5,264,058 A | 11/1993 | Hoagland et al. | |
| 5,300,184 A | 4/1994 | Masunaga | |
| 5,707,581 A * | 1/1998 | Yamazaki | B29C 45/14008 264/153 |
| 5,711,119 A | 1/1998 | Cornils et al. | |
| 5,897,937 A | 4/1999 | Cornils et al. | |
| 5,916,600 A * | 6/1999 | Dubay | B29C 33/0044 425/116 |
| 6,044,662 A | 4/2000 | Morin | |
| 6,071,456 A * | 6/2000 | Hanamoto | B29C 45/1418 264/265 |
| 6,086,983 A | 7/2000 | Yoshizawa | |
| 6,101,748 A | 8/2000 | Cass et al. | |
| 6,242,931 B1 | 6/2001 | Hembree et al. | |
| 6,265,054 B1 * | 7/2001 | Bravet | B29C 45/14467 428/213 |
| 6,270,605 B1 | 8/2001 | Doerfler | |
| 6,274,219 B1 | 8/2001 | Schuster et al. | |
| 6,287,674 B1 | 9/2001 | Verlinden et al. | |
| 6,302,985 B1 | 10/2001 | Takahashi et al. | |
| 6,332,690 B1 | 12/2001 | Murofushi | |
| 6,387,515 B1 | 5/2002 | Joret et al. | |
| 6,420,800 B1 | 7/2002 | Levesque et al. | |
| 6,426,138 B1 | 7/2002 | Narushima et al. | |
| 6,582,799 B1 | 6/2003 | Brown et al. | |
| 6,620,365 B1 * | 9/2003 | Odoi | B29C 45/14377 264/261 |
| 6,816,225 B2 | 11/2004 | Colgan et al. | |
| 6,903,871 B2 | 6/2005 | Page | |
| 7,297,040 B2 | 11/2007 | Chang et al. | |
| 7,375,782 B2 | 5/2008 | Yamazaki et al. | |
| 7,478,930 B2 | 1/2009 | Choi | |
| 7,489,303 B1 | 2/2009 | Pryor | |
| 7,542,302 B1 | 6/2009 | Curnalia et al. | |
| 7,750,821 B1 | 7/2010 | Taborisskiy et al. | |
| 7,955,470 B2 | 6/2011 | Kapp et al. | |
| 8,298,431 B2 | 10/2012 | Chwu et al. | |
| 8,344,369 B2 | 1/2013 | Yamazaki et al. | |
| 8,521,955 B2 | 8/2013 | Arulambalam et al. | |
| 8,549,885 B2 | 10/2013 | Dannoux et al. | |
| 8,586,492 B2 | 11/2013 | Barefoot et al. | |
| 8,652,978 B2 | 2/2014 | Dejneka et al. | |
| 8,692,787 B2 | 4/2014 | Imazeki | |
| 8,702,253 B2 | 4/2014 | Lu et al. | |
| 8,765,262 B2 | 6/2014 | Gross | |
| 8,833,106 B2 | 9/2014 | Dannoux et al. | |
| 8,912,447 B2 | 12/2014 | Leong et al. | |
| 8,923,693 B2 | 12/2014 | Yeates | |
| 8,962,084 B2 | 2/2015 | Brackley et al. | |
| 8,967,834 B2 | 3/2015 | Timmerman et al. | |
| 8,969,226 B2 | 3/2015 | Dejneka et al. | |
| 8,978,418 B2 | 3/2015 | Balduin et al. | |
| 9,007,226 B2 | 4/2015 | Chang | |
| 9,061,934 B2 | 6/2015 | Bisson et al. | |
| 9,090,501 B2 | 7/2015 | Okahata et al. | |
| 9,109,881 B2 | 8/2015 | Roussev et al. | |
| 9,140,543 B1 | 9/2015 | Allan et al. | |
| 9,156,724 B2 | 10/2015 | Gross | |
| 9,223,162 B2 | 12/2015 | Deforest et al. | |
| 9,240,437 B2 | 1/2016 | Shieh et al. | |
| 9,278,500 B2 | 3/2016 | Filipp | |
| 9,278,655 B2 | 3/2016 | Jones et al. | |
| 9,290,413 B2 | 3/2016 | Dejneka et al. | |
| 9,346,703 B2 | 5/2016 | Bookbinder et al. | |
| 9,346,706 B2 | 5/2016 | Bazemore et al. | |
| 9,357,638 B2 | 5/2016 | Lee et al. | |
| 9,442,028 B2 | 9/2016 | Roussev et al. | |
| 9,446,723 B2 | 9/2016 | Stepanski | |
| 9,469,561 B2 | 10/2016 | Kladias et al. | |
| 9,517,967 B2 | 12/2016 | Dejneka et al. | |
| 9,573,843 B2 | 2/2017 | Keegan et al. | |
| 9,593,042 B2 | 3/2017 | Hu et al. | |
| 9,595,960 B2 | 3/2017 | Wilford | |
| 9,606,625 B2 | 3/2017 | Levesque et al. | |
| 9,617,180 B2 | 4/2017 | Bookbinder et al. | |
| 9,663,396 B2 | 5/2017 | Miyasaka et al. | |
| 9,694,570 B2 | 7/2017 | Levasseur et al. | |
| 9,700,985 B2 | 7/2017 | Kashima et al. | |
| 9,701,564 B2 | 7/2017 | Bookbinder et al. | |
| 9,720,450 B2 | 7/2017 | Choi et al. | |
| 9,724,727 B2 | 8/2017 | Domey et al. | |
| 9,802,485 B2 | 10/2017 | Masuda et al. | |
| 9,815,730 B2 | 11/2017 | Marjanovic et al. | |
| 9,821,509 B2 | 11/2017 | Kastell | |
| 9,895,975 B2 | 2/2018 | Lee et al. | |
| 9,902,640 B2 | 2/2018 | Dannoux et al. | |
| 9,931,817 B2 | 4/2018 | Rickerl | |
| 9,933,820 B2 | 4/2018 | Helot et al. | |
| 9,947,882 B2 | 4/2018 | Zhang et al. | |
| 9,955,602 B2 | 4/2018 | Wildner et al. | |
| 9,957,190 B2 | 4/2018 | Finkeldey et al. | |
| 9,963,374 B2 | 5/2018 | Jouanno et al. | |
| 9,972,645 B2 | 5/2018 | Kim | |
| 9,975,801 B2 | 5/2018 | Maschmeyer et al. | |
| 9,992,888 B2 | 6/2018 | Moon et al. | |
| 10,005,246 B2 | 6/2018 | Stepanski | |
| 10,042,391 B2 | 8/2018 | Yun et al. | |
| 10,074,824 B2 | 9/2018 | Han et al. | |
| 10,086,762 B2 | 10/2018 | Uhm | |
| 10,131,118 B2 | 11/2018 | Kang et al. | |
| 10,140,018 B2 | 11/2018 | Kim et al. | |
| 10,153,337 B2 | 12/2018 | Lee et al. | |
| 10,175,802 B2 | 1/2019 | Boggs et al. | |
| 10,211,416 B2 | 2/2019 | Jin et al. | |
| 10,222,825 B2 | 3/2019 | Wang et al. | |
| 10,273,184 B2 | 4/2019 | Garner et al. | |
| 10,303,223 B2 | 5/2019 | Park et al. | |
| 10,303,315 B2 | 5/2019 | Jeong et al. | |
| 10,326,101 B2 | 6/2019 | Oh et al. | |
| 10,328,865 B2 | 6/2019 | Jung | |
| 10,343,377 B2 | 7/2019 | Levasseur et al. | |
| 10,347,700 B2 | 7/2019 | Yang et al. | |
| 10,377,656 B2 | 8/2019 | Dannoux et al. | |
| 10,421,683 B2 | 9/2019 | Schillinger et al. | |
| 10,427,383 B2 | 9/2019 | Levasseur et al. | |
| 10,444,427 B2 | 10/2019 | Bookbinder et al. | |
| 10,483,210 B2 | 11/2019 | Gross et al. | |
| 10,500,958 B2 | 12/2019 | Cho et al. | |
| 10,606,395 B2 | 3/2020 | Boggs et al. | |
| 10,649,267 B2 | 5/2020 | Tuan et al. | |
| 10,788,707 B2 | 9/2020 | Ai et al. | |
| 10,976,607 B2 | 4/2021 | Huang et al. | |
| 2002/0039229 A1 | 4/2002 | Hirose et al. | |
| 2004/0026021 A1 | 2/2004 | Groh et al. | |
| 2004/0069770 A1 | 4/2004 | Cary et al. | |
| 2004/0107731 A1 | 6/2004 | Doehring et al. | |
| 2004/0258929 A1 | 12/2004 | Glaubitt et al. | |
| 2005/0178158 A1 | 8/2005 | Moulding et al. | |
| 2006/0227125 A1 | 10/2006 | Wong et al. | |
| 2007/0188871 A1 | 8/2007 | Fleury et al. | |

(56) References Cited

U.S. PATENT DOCUMENTS

| | | |
|---|---|---|
| 2007/0195419 A1 | 8/2007 | Tsuda et al. |
| 2007/0210621 A1 | 9/2007 | Barton et al. |
| 2007/0221313 A1* | 9/2007 | Franck .................... F24S 23/82 156/91 |
| 2007/0223121 A1 | 9/2007 | Franck et al. |
| 2007/0291384 A1 | 12/2007 | Wang |
| 2008/0031991 A1* | 2/2008 | Choi ................ B29C 45/14434 425/149 |
| 2008/0093753 A1 | 4/2008 | Schuetz |
| 2008/0285134 A1 | 11/2008 | Closset et al. |
| 2008/0303976 A1 | 12/2008 | Nishizawa et al. |
| 2009/0096937 A1 | 4/2009 | Bauer et al. |
| 2009/0101208 A1 | 4/2009 | Vandal et al. |
| 2009/0117332 A1 | 5/2009 | Ellsworth et al. |
| 2009/0179840 A1 | 7/2009 | Tanaka et al. |
| 2009/0185127 A1 | 7/2009 | Tanaka et al. |
| 2009/0201443 A1 | 8/2009 | Sasaki et al. |
| 2009/0311497 A1 | 12/2009 | Aoki |
| 2010/0000259 A1 | 1/2010 | Ukrainczyk et al. |
| 2010/0031590 A1 | 2/2010 | Buchwald et al. |
| 2010/0065342 A1 | 3/2010 | Shaikh |
| 2010/0103138 A1* | 4/2010 | Huang ................ H05K 3/0014 345/174 |
| 2010/0182143 A1 | 7/2010 | Lynam |
| 2010/0245253 A1 | 9/2010 | Rhyu et al. |
| 2011/0057465 A1 | 3/2011 | Beau et al. |
| 2011/0148267 A1 | 6/2011 | Mcdaniel et al. |
| 2012/0050975 A1 | 2/2012 | Garelli et al. |
| 2012/0111056 A1 | 5/2012 | Prest |
| 2012/0128952 A1 | 5/2012 | Miwa et al. |
| 2012/0134025 A1 | 5/2012 | Hart |
| 2012/0144866 A1 | 6/2012 | Liu et al. |
| 2012/0152897 A1 | 6/2012 | Cheng et al. |
| 2012/0196110 A1 | 8/2012 | Murata et al. |
| 2012/0202030 A1 | 8/2012 | Kondo et al. |
| 2012/0218640 A1 | 8/2012 | Gollier et al. |
| 2012/0263945 A1 | 10/2012 | Yoshikawa |
| 2012/0280368 A1 | 11/2012 | Garner et al. |
| 2012/0320509 A1 | 12/2012 | Kim et al. |
| 2013/0020007 A1 | 1/2013 | Niiyama et al. |
| 2013/0033885 A1 | 2/2013 | Oh et al. |
| 2013/0070340 A1 | 3/2013 | Shelestak et al. |
| 2013/0081428 A1 | 4/2013 | Liu et al. |
| 2013/0088441 A1 | 4/2013 | Chung et al. |
| 2013/0120850 A1 | 5/2013 | Lambert et al. |
| 2013/0186141 A1 | 7/2013 | Henry |
| 2013/0209824 A1 | 8/2013 | Sun et al. |
| 2013/0279188 A1 | 10/2013 | Entenmann et al. |
| 2013/0314642 A1 | 11/2013 | Timmerman et al. |
| 2013/0329346 A1 | 12/2013 | Dannoux et al. |
| 2013/0330495 A1 | 12/2013 | Maatta et al. |
| 2014/0014260 A1 | 1/2014 | Chowdhury et al. |
| 2014/0036428 A1 | 2/2014 | Seng et al. |
| 2014/0065374 A1 | 3/2014 | Tsuchiya et al. |
| 2014/0141206 A1 | 5/2014 | Gillard et al. |
| 2014/0146538 A1 | 5/2014 | Zenker et al. |
| 2014/0153234 A1 | 6/2014 | Knoche et al. |
| 2014/0153894 A1 | 6/2014 | Jenkins et al. |
| 2014/0168153 A1 | 6/2014 | Deichmann et al. |
| 2014/0168546 A1 | 6/2014 | Magnusson et al. |
| 2014/0234581 A1 | 8/2014 | Immerman et al. |
| 2014/0333848 A1 | 11/2014 | Chen |
| 2014/0340609 A1 | 11/2014 | Taylor et al. |
| 2015/0015807 A1 | 1/2015 | Franke et al. |
| 2015/0072129 A1 | 3/2015 | Okahata et al. |
| 2015/0077429 A1 | 3/2015 | Eguchi et al. |
| 2015/0168768 A1 | 6/2015 | Nagatani |
| 2015/0177443 A1 | 6/2015 | Faecke et al. |
| 2015/0210588 A1 | 7/2015 | Chang et al. |
| 2015/0246424 A1 | 9/2015 | Venkatachalam et al. |
| 2015/0246507 A1 | 9/2015 | Brown et al. |
| 2015/0274585 A1 | 9/2015 | Rogers et al. |
| 2015/0322270 A1 | 11/2015 | Amin et al. |
| 2015/0357387 A1 | 12/2015 | Lee et al. |
| 2016/0009066 A1 | 1/2016 | Nieber et al. |
| 2016/0009068 A1 | 1/2016 | Garner |
| 2016/0016849 A1 | 1/2016 | Allan |
| 2016/0039705 A1 | 2/2016 | Kato et al. |
| 2016/0052241 A1 | 2/2016 | Zhang |
| 2016/0066463 A1 | 3/2016 | Yang et al. |
| 2016/0081204 A1 | 3/2016 | Park et al. |
| 2016/0083292 A1 | 3/2016 | Tabe et al. |
| 2016/0091645 A1 | 3/2016 | Birman et al. |
| 2016/0102015 A1 | 4/2016 | Yasuda et al. |
| 2016/0113135 A1 | 4/2016 | Kim et al. |
| 2016/0207290 A1 | 7/2016 | Cleary et al. |
| 2016/0216434 A1 | 7/2016 | Shih et al. |
| 2016/0250982 A1 | 8/2016 | Fisher et al. |
| 2016/0252656 A1 | 8/2016 | Waldschmidt et al. |
| 2016/0272529 A1 | 9/2016 | Hong et al. |
| 2016/0297176 A1 | 10/2016 | Rickerl |
| 2016/0306451 A1* | 10/2016 | Isoda .................... B32B 27/325 |
| 2016/0313494 A1 | 10/2016 | Hamilton et al. |
| 2016/0354996 A1 | 12/2016 | Alder et al. |
| 2016/0355901 A1 | 12/2016 | Isozaki et al. |
| 2016/0375808 A1 | 12/2016 | Etienne et al. |
| 2017/0008377 A1 | 1/2017 | Fisher et al. |
| 2017/0021661 A1 | 1/2017 | Pelucchi |
| 2017/0066223 A1 | 3/2017 | Notsu et al. |
| 2017/0081238 A1* | 3/2017 | Jones .................. C03B 23/0307 |
| 2017/0088454 A1 | 3/2017 | Fukushima et al. |
| 2017/0094039 A1 | 3/2017 | Lu |
| 2017/0115944 A1 | 4/2017 | Oh et al. |
| 2017/0158551 A1 | 6/2017 | Bookbinder et al. |
| 2017/0160434 A1 | 6/2017 | Hart et al. |
| 2017/0185289 A1 | 6/2017 | Kim et al. |
| 2017/0190152 A1 | 7/2017 | Notsu et al. |
| 2017/0197561 A1 | 7/2017 | Mcfarland |
| 2017/0213872 A1 | 7/2017 | Jinbo et al. |
| 2017/0217290 A1 | 8/2017 | Yoshizumi et al. |
| 2017/0217815 A1 | 8/2017 | Dannoux et al. |
| 2017/0240772 A1 | 8/2017 | Dohner et al. |
| 2017/0247291 A1 | 8/2017 | Hatano et al. |
| 2017/0262057 A1 | 9/2017 | Knittl et al. |
| 2017/0263690 A1 | 9/2017 | Lee et al. |
| 2017/0274627 A1 | 9/2017 | Chang et al. |
| 2017/0285227 A1 | 10/2017 | Chen et al. |
| 2017/0305786 A1 | 10/2017 | Roussev et al. |
| 2017/0327402 A1 | 11/2017 | Fujii et al. |
| 2017/0334770 A1 | 11/2017 | Luzzato et al. |
| 2017/0349473 A1 | 12/2017 | Moriya et al. |
| 2018/0009197 A1 | 1/2018 | Gross et al. |
| 2018/0014420 A1 | 1/2018 | Amin et al. |
| 2018/0031743 A1 | 1/2018 | Wakatsuki et al. |
| 2018/0050948 A1 | 2/2018 | Faik et al. |
| 2018/0069053 A1 | 3/2018 | Bok |
| 2018/0072022 A1 | 3/2018 | Tsai et al. |
| 2018/0103132 A1 | 4/2018 | Prushinskiy et al. |
| 2018/0111569 A1 | 4/2018 | Faik et al. |
| 2018/0122863 A1 | 5/2018 | Bok |
| 2018/0125228 A1 | 5/2018 | Porter et al. |
| 2018/0134232 A1 | 5/2018 | Helot |
| 2018/0141850 A1 | 5/2018 | Dejneka et al. |
| 2018/0147985 A1 | 5/2018 | Brown et al. |
| 2018/0149777 A1 | 5/2018 | Brown |
| 2018/0149907 A1 | 5/2018 | Gahagan et al. |
| 2018/0164850 A1 | 6/2018 | Sim et al. |
| 2018/0186674 A1 | 7/2018 | Kumar et al. |
| 2018/0188869 A1 | 7/2018 | Boggs et al. |
| 2018/0208131 A1 | 7/2018 | Mattelet et al. |
| 2018/0208494 A1 | 7/2018 | Mattelet et al. |
| 2018/0210118 A1 | 7/2018 | Gollier et al. |
| 2018/0215125 A1 | 8/2018 | Gahagan |
| 2018/0245125 A1 | 8/2018 | Tsai et al. |
| 2018/0304825 A1 | 10/2018 | Mattelet et al. |
| 2018/0324964 A1 | 11/2018 | Yoo et al. |
| 2018/0345644 A1 | 12/2018 | Kang et al. |
| 2018/0364760 A1 | 12/2018 | Ahn et al. |
| 2018/0374906 A1 | 12/2018 | Everaerts et al. |
| 2019/0034017 A1 | 1/2019 | Boggs et al. |
| 2019/0039352 A1 | 2/2019 | Zhao et al. |
| 2019/0039935 A1 | 2/2019 | Couillard et al. |
| 2019/0069451 A1 | 2/2019 | Myers et al. |
| 2019/0077337 A1 | 3/2019 | Gervelmeyer |

(56) References Cited

U.S. PATENT DOCUMENTS

| | | | |
|---|---|---|---|
| 2019/0152831 A1 | 5/2019 | An et al. | |
| 2019/0223309 A1 | 7/2019 | Amin et al. | |
| 2019/0295494 A1 | 9/2019 | Wang et al. | |
| 2019/0315648 A1 | 10/2019 | Kumar et al. | |
| 2019/0329531 A1 | 10/2019 | Brennan et al. | |
| 2020/0064535 A1 | 2/2020 | Haan et al. | |
| 2020/0301192 A1 | 9/2020 | Huang et al. | |
| 2021/0055599 A1 | 2/2021 | Chen et al. | |

FOREIGN PATENT DOCUMENTS

| | | | |
|---|---|---|---|
| CN | 101600846 A | 12/2009 | |
| CN | 101684032 A | 3/2010 | |
| CN | 201989544 U | 9/2011 | |
| CN | 102341356 A | 1/2012 | |
| CN | 102464456 A | 5/2012 | |
| CN | 103136490 A | 6/2013 | |
| CN | 103587161 A | 2/2014 | |
| CN | 203825589 U | 9/2014 | |
| CN | 204111583 U | 1/2015 | |
| CN | 102566841 B | 4/2015 | |
| CN | 104656999 A | 5/2015 | |
| CN | 104679341 A | 6/2015 | |
| CN | 204463066 U | 7/2015 | |
| CN | 104843976 A | 8/2015 | |
| CN | 105118391 A | 12/2015 | |
| CN | 105511127 A | 4/2016 | |
| CN | 205239166 U | 5/2016 | |
| CN | 105705330 A | 6/2016 | |
| CN | 106256794 A | 12/2016 | |
| CN | 205905907 U | 1/2017 | |
| CN | 106458683 A | 2/2017 | |
| CN | 206114596 U | 4/2017 | |
| CN | 206114956 U | 4/2017 | |
| CN | 107613809 A | 1/2018 | |
| CN | 107757516 A | 3/2018 | |
| CN | 108519831 A | 9/2018 | |
| CN | 108550587 A | 9/2018 | |
| CN | 108725350 A | 11/2018 | |
| CN | 109135605 A | 1/2019 | |
| CN | 109690662 A | 4/2019 | |
| CN | 109743421 A | 5/2019 | |
| DE | 4415787 A1 | 11/1995 | |
| DE | 4415878 A1 | 11/1995 | |
| DE | 69703490 T2 | 5/2001 | |
| DE | 102004022008 A1 | 12/2004 | |
| DE | 102004002208 A1 | 8/2005 | |
| DE | 102009021938 A1 | 11/2010 | |
| DE | 102010007204 A1 | 8/2011 | |
| DE | 102013214108 A1 | 2/2015 | |
| DE | 102014116798 A1 | 5/2016 | |
| EP | 0076924 A2 | 4/1983 | |
| EP | 0316224 A1 | 5/1989 | |
| EP | 0347049 A2 | 12/1989 | |
| EP | 0418700 A1 | 3/1991 | |
| EP | 0423698 A1 | 4/1991 | |
| EP | 0525970 A1 | 2/1993 | |
| EP | 0664210 A1 | 7/1995 | |
| EP | 1013622 A1 | 6/2000 | |
| EP | 1031409 A1 | 8/2000 | |
| EP | 1046493 A2 | 10/2000 | |
| EP | 0910721 B1 | 11/2000 | |
| EP | 1647663 A1 | 4/2006 | |
| EP | 2236281 A1 | 10/2010 | |
| EP | 2385630 A2 | 11/2011 | |
| EP | 2521118 A2 | 11/2012 | |
| EP | 2852502 A2 | 3/2015 | |
| EP | 2933718 A1 | 10/2015 | |
| EP | 3093181 A2 | 11/2016 | |
| EP | 3100854 A1 | 12/2016 | |
| EP | 3118174 A1 | 1/2017 | |
| EP | 3118175 A1 | 1/2017 | |
| EP | 3144141 A1 | 3/2017 | |
| EP | 3156286 A1 | 4/2017 | |
| EP | 3189965 A1 | 7/2017 | |
| EP | 3288791 A1 | 3/2018 | |
| EP | 3426614 A1 | 1/2019 | |
| EP | 3532442 A1 | 9/2019 | |
| FR | 2750075 A1 | 12/1997 | |
| FR | 2918411 B1 | 10/2013 | |
| FR | 3012073 A1 | 4/2015 | |
| GB | 0805770 A | 12/1958 | |
| GB | 2011316 A | 7/1979 | |
| GB | 2281542 A | 3/1995 | |
| JP | 55-154329 | 11/1980 | |
| JP | 57-048082 A | 3/1982 | |
| JP | 58-073681 A | 5/1983 | |
| JP | 58-194751 | 11/1983 | |
| JP | 59-076561 A | 4/1984 | |
| JP | 63089317 | * | 4/1988 |
| JP | 63-190730 | 8/1988 | |
| JP | 3059337 U | 6/1991 | |
| JP | 03-228840 A | 10/1991 | |
| JP | 04-119931 | 4/1992 | |
| JP | 05-116972 A | 5/1993 | |
| JP | 06-340029 A | 12/1994 | |
| JP | 10-218630 A | 8/1998 | |
| JP | 11-001349 A | 1/1999 | |
| JP | 11-006029 A | 1/1999 | |
| JP | 11-060293 A | 3/1999 | |
| JP | 2000-260330 A | 9/2000 | |
| JP | 2002-255574 A | 9/2002 | |
| JP | 2003-500260 A | 1/2003 | |
| JP | 2003-276571 A | 10/2003 | |
| JP | 2003-321257 A | 11/2003 | |
| JP | 2004-101712 A | 4/2004 | |
| JP | 2004-284839 A | 10/2004 | |
| JP | 2006181936 | * | 7/2006 |
| JP | 2007-188035 A | 7/2007 | |
| JP | 2007-197288 A | 8/2007 | |
| JP | 2010-145731 A | 6/2010 | |
| JP | 2012-111661 A | 6/2012 | |
| JP | 2013-084269 A | 5/2013 | |
| JP | 2014-126564 A | 7/2014 | |
| JP | 2015-502901 A | 1/2015 | |
| JP | 2015092422 A | 5/2015 | |
| JP | 5748082 B2 | 7/2015 | |
| JP | 5796561 B2 | 10/2015 | |
| JP | 2016-500458 A | 1/2016 | |
| JP | 2016031696 A | 3/2016 | |
| JP | 2016-517380 A | 6/2016 | |
| JP | 2016-130810 A | 7/2016 | |
| JP | 2016-144008 A | 8/2016 | |
| JP | 05976561 B2 | 8/2016 | |
| JP | 2016-530204 A | 9/2016 | |
| JP | 2016173794 A | 9/2016 | |
| JP | 2016-207200 A | 12/2016 | |
| JP | 2016203609 A | 12/2016 | |
| JP | 6281825 B2 | 2/2018 | |
| JP | 6340029 B2 | 6/2018 | |
| KR | 2002-0019045 A | 3/2002 | |
| KR | 10-0479282 B1 | 8/2005 | |
| KR | 10-2008-0023888 A | 3/2008 | |
| KR | 10-2013-0005776 A | 1/2013 | |
| KR | 10-2014-0111403 A | 9/2014 | |
| KR | 10-2015-0026911 A | 3/2015 | |
| KR | 10-2015-0033969 A | 4/2015 | |
| KR | 10-2015-0051458 A | 5/2015 | |
| KR | 10-1550833 B1 | 9/2015 | |
| KR | 10-2015-0121101 A | 10/2015 | |
| KR | 10-2016-0118746 A | 10/2016 | |
| KR | 10-1674060 B1 | 11/2016 | |
| KR | 10-2016-0144008 A | 12/2016 | |
| KR | 10-2017-0000208 A | 1/2017 | |
| KR | 10-2017-0106263 A | 9/2017 | |
| KR | 10-2017-0107124 A | 9/2017 | |
| KR | 10-2017-0113822 A | 10/2017 | |
| KR | 10-2017-0121674 A | 11/2017 | |
| KR | 10-2018-0028597 A | 3/2018 | |
| KR | 10-2018-0049484 A | 5/2018 | |
| KR | 10-2018-0049780 A | 5/2018 | |
| KR | 10-2019-0001864 A | 1/2019 | |
| KR | 10-2019-0081264 A | 7/2019 | |
| SB | 0991867 A | 5/1965 | |

(56) References Cited

FOREIGN PATENT DOCUMENTS

| | | |
|---|---|---|
| SB | 1319846 A | 6/1973 |
| TW | 200704268 A | 1/2007 |
| TW | 201438895 A | 10/2014 |
| TW | 201546006 A | 12/2015 |
| TW | 201636309 A | 10/2016 |
| TW | 201637857 A | 10/2016 |
| VN | 58334 | 7/2018 |
| WO | 94/25272 A1 | 11/1994 |
| WO | 97/39074 A1 | 10/1997 |
| WO | 9801649 A1 | 1/1998 |
| WO | 2000/073062 A1 | 12/2000 |
| WO | 2006/095005 A1 | 9/2006 |
| WO | 2007108861 A1 | 9/2007 |
| WO | 2008/042731 A1 | 4/2008 |
| WO | 2008/153484 A1 | 12/2008 |
| WO | 2009/072530 A1 | 6/2009 |
| WO | 2011/029852 A1 | 3/2011 |
| WO | 2011/144359 A1 | 11/2011 |
| WO | 2011/155403 A1 | 12/2011 |
| WO | 2012/005307 A1 | 1/2012 |
| WO | 2012058084 A2 | 5/2012 |
| WO | 2012/166343 A2 | 12/2012 |
| WO | 2013/072611 A1 | 5/2013 |
| WO | 2013/072612 A1 | 5/2013 |
| WO | 2013/174715 A1 | 11/2013 |
| WO | 2013/175106 A2 | 11/2013 |
| WO | 2014/085663 A1 | 6/2014 |
| WO | 2014/107640 A1 | 7/2014 |
| WO | 2014/172237 A2 | 10/2014 |
| WO | 2014/175371 A1 | 10/2014 |
| WO | 2015031594 A2 | 3/2015 |
| WO | 2015/055583 A1 | 4/2015 |
| WO | 2015/057552 A2 | 4/2015 |
| WO | 2015/084902 A1 | 6/2015 |
| WO | 2015/085283 A1 | 6/2015 |
| WO | 2015/141966 A1 | 9/2015 |
| WO | 2016/007815 A1 | 1/2016 |
| WO | 2016/007843 A1 | 1/2016 |
| WO | 2016/010947 A1 | 1/2016 |
| WO | 2016/010949 A1 | 1/2016 |
| WO | 2016044360 A1 | 3/2016 |
| WO | 2016/069113 A1 | 5/2016 |
| WO | 2016/070974 A1 | 5/2016 |
| WO | 2016/115311 A1 | 7/2016 |
| WO | 2016/125713 A1 | 8/2016 |
| WO | 2016/136758 A1 | 9/2016 |
| WO | 2016/173699 A1 | 11/2016 |
| WO | 2016/183059 A1 | 11/2016 |
| WO | 2016/195301 A1 | 12/2016 |
| WO | 2016/202605 A1 | 12/2016 |
| WO | 2016196531 A1 | 12/2016 |
| WO | 2016196546 A1 | 12/2016 |
| WO | 2017/015392 A1 | 1/2017 |
| WO | 2017/019851 A1 | 2/2017 |
| WO | 2017/023673 A1 | 2/2017 |
| WO | 2017/106081 A1 | 6/2017 |
| WO | 2017/146866 A1 | 8/2017 |
| WO | 2017/158031 A1 | 9/2017 |
| WO | 2017155932 A1 | 9/2017 |
| WO | 2018/015392 A1 | 1/2018 |
| WO | 2018005646 A1 | 1/2018 |
| WO | 2018009504 A1 | 1/2018 |
| WO | 2018075853 A1 | 4/2018 |
| WO | 2018081068 A1 | 5/2018 |
| WO | 2018/102332 A1 | 6/2018 |
| WO | 2018125683 A1 | 7/2018 |
| WO | 2018/160812 A2 | 9/2018 |
| WO | 2018/200454 A1 | 10/2018 |
| WO | 2018/200807 A1 | 10/2018 |
| WO | 2018/213267 A1 | 11/2018 |
| WO | 2019/055469 A1 | 3/2019 |
| WO | 2019/055652 A1 | 3/2019 |
| WO | 2019/074800 A1 | 4/2019 |
| WO | 2019/075065 A1 | 4/2019 |
| WO | 2019/151618 A1 | 8/2019 |

OTHER PUBLICATIONS

"Product Information Sheet", Corning® Gorilla® Glass 3 with Native Damage Resistance™, Corning Incorporated, Rev: F_090315, 2015, 2 pages.

"Stainless Steel—Grade 410 (UNS S41000)", available online at <https://www.azom.com/article.aspx?ArticleID=970>, Oct. 23, 2001, 5 pages.

"Standard Test Method for Measurement of Glass Stress—Optical Coefficient", ASTM International, Designation: C770-16, 2016.

"Stiles Custom Metal, Inc"., Installation Recommendations, Retrieved from: https://stilesdoors.com/techdata/pdf/Installation%20Recommendations%20HM%20Windows,%20Transoms%20&%>OSidelites%200710.pdf), 2010, 3 Pages.

Ashley Klamer, "Dead front overlays", Marking Systems, Inc., Jul. 8, 2013, 2 pages.

ASTM C1279-13 "Standard Test Method for Non-Destructive Photoelastic Measurement of Edge and Surface Stresses in Annealed, Heat-Strengthened, and Fully Tempered Flat Glass"; Downloaded Jan. 24, 2018; 11 Pages.

ASTM C1422/C1422M-10 "Standard Specification for Chemically Strengthened Flat Glass"; Downloaded Jan. 24, 2018; 5 pages.

ASTM Standard C770-98 (2013), "Standard Test Method for Measurement of Glass Stress-Optical Coellicient", 2013, 8 pages.

Author Unknown; "Stress Optics Laboratory Practice Guide" 2012; 11 Pages.

Belis et al; "Cold Bending of Laminated Glass Panels"; Heron vol. 52 (2007) No. 1/2; 24 Pages.

Burchardt et al., (Editorial Team), Elastic Bonding: The basic principles of adhesive technology and a guide to its cost-effective use in industry, 2006, 71 pages.

Byun et al; "A Novel Route for Thinning of LCD Glass Substrates"; SID 06 DIGEST; pp. 1786-1788, v37, 2006.

Datsiou et al., "Behaviour of cold bent glass plates during the shaping process", Engineered Transparency. International Conference atglasstec, Dusseldorf, Germany, Oct. 21 and 22, 2014, 9 pages.

Doyle et al; "Manual on Experimental Stress Analysis"; Fifth Edition, Society for Experimental Mechanics; 31 Pages.

Elziere; "Laminated Glass: Dynamic Rupture of Adhesion"; Polymers; Universite Pierre Et Marie Curie-Paris VI, 2016. English; 181 Pages.

Engineering ToolBox, "Coefficients of Linear Thermal Expansion", available online at <https://www.engineeringtoolbox.com/linear-expansion-coefficients-d_95.html>, 2003, 9 pages.

Fauercia "Intuitive HMI for a Smart Life on Board" (2018); 8 Pages http://www.faurecia.com/en/innovation/smart-life-board/intuitive-HMI.

Faurecia: Smart Pebbles, Nov. 10, 2016 (Nov. 10, 2016), XP055422209, Retrieved from the Internet: URL:https://web.archive.org/web/20171123002248/http://www.faurecia.com/en/innovation/discover-our-innovations/smart-pebbles[retrieved on Nov. 23, 2017], 4 Pages.

Ferwerda et al., "Perception of sparkle in anti-glare display screens", Journal of the SID, vol. 22, Issue 2, 2014, pp. 129-136.

Fildhuth et al; "Considerations Using Curved, Heat or Cold Bent Glass for Assembling Full Glass Shells", Engineered Transparency, International Conference at Glasstec, Dusseldorf, Germany, Oct. 25 and 26, 2012; 11 Pages.

Fildhuth et al; "Interior Stress Monitoring of Laminated Cold Bent Glass With Fibre Bragg Sensors", Challenging Glass 4 & Cost Action TU0905 Final Conference Louter, Bos & Belis (Eds), 2014; 8 Pages.

Fildhuth et al; "Layout Strategies and Optimisation of Joint Patterns in Full Glass Shells", Challenging Glass 3—Conference on Architectural and Structural Applications of Glass, Bos, Louter, Nijsse, Veer (Eds.), Tu Delft, Jun. 2012; 13 Pages.

Fildhuth et al; "Recovery Behaviour of Laminated Cold Bent Glass—Numerical Analysis and Testing"; Challenging Glass 4 & Cost Action TU0905 Final Conference—Louter, Bos & Beus (Eds) (2014); 9 Pages.

Fildhuth; "Design and Monitoring of Cold Bent Lamination—Stabilised Glass"; ITKE 39 (2015) 270 Pages.

(56) References Cited

OTHER PUBLICATIONS

Galuppi et al; "Buckling Phenomena In Double Curved Cold-Bent Glass;" Intl. Journal of Non-Linear Mechanics, vol. 64, 2014, pp. 70-84.

Galuppi et al; "Cold-Lamination-Bending Of Glass: Sinusoidal Is Better Than Circular", Composites Part B, 79, 2015, pp. 285-300.

Galuppi et al; "Large Deformations And Snap-Through Instability Of Cold-Bent Glass"; Challenging Glass 4 & Cost Action TU0905 Final Conference, 2014, pp. 681-689.

Galuppi et al; "Optical Cold Bending Of Laminated Glass"; International Journal Of Solids And Structures, vol. 67-68, 2015, pp. 231-243.

Galuppi L et al: "Optimal cold bending of laminated glass", Jan. 1, 2007 vol. 52, No. 1/2 Jan. 1, 2007 (Jan. 1, 2007), pp. 123-146.

Gollier et al., "Display Sparkle Measurement and Human Response", SID Symposium Digest of Technical Papers, vol. 44, Issue 1, 2013, pp. 295-297.

Indian Patent Application No. 201917031293 Office Action dated May 24, 2021; 6 pages; Indian Patent Office.

Jalopnik, "This Touch Screen Car Interior is a Realistic Vision of the Near Future", jalopnik.com, Nov. 19, 2014, https://jalopnik.com/this-touch-screen-car-interior-is-a-realistic-vision-of-1660846024 (Year: 2014).

Li et al., "Effective Surface Treatment on the Cover Glass for Autointerior Applications", SID Symposium Digest of Technical Papers, vol. 47, 2016, pp. 467-469.

Millard; "Bending Glass In The Parametric Age", Retrieved from: http://www.enclos.com/site-info/news/bending-glass-in-the-parametric-age, ENCLOS, 2015, pp. 1-6.

Neugebauer et al; "Let Thin Glass In The Faade Move Thin Glass-New Possibilities For Glass In The Faade", Conference Paper, Jun. 2018, 12 Pages.

Pambianchi et al; "Corning Incorporated: Designing A New Future With Glass And Optics"; Chapter 1 In "Materials Research For Manufacturing: An Industrial Perspective Of Turning Materials Into New Products"; Springer Series Material Science, Issue 224, 2016, pp. 12.

Pegatron Corp. "Pegaton Navigate The Future"; Ecockpit/Center Console Work Premiere; Automotive Worlds, Downloaded on Jul. 12, 2017, 2 Pages.

Photodon, "Screen Protectors For Your Car's Navi System That You're Gonna Love", photodon.com, Nov. 6, 2015, https://www.photodon.com/blog/archives/screen-protectors-for-your-cars-navi-system-that-youre-gonna-love) (Year: 2015).

Scholze, H., "Glass-Water Interactions", Journal of Non-Crystalline Solids vol. 102, Issues 1-3, Jun. 1, 1988, pp. 1-10.

Stattler, "NewWave—Curved Glass Shapes Design", Glass Magazine, 2013; 2 Pages.

Tomozawa et al., "Hydrogen-to-Alkali Ratio in Hydrated Alkali Aluminosilicate Glass Surfaces", Journal of Non-Crystalline Solids, vol. 358, Issue 24, Dec. 15, 2012, pp. 3546-3550.

Vakar et al.; "Cold Bendable, Laminated Glass—New Possibilities In Design"; Structural Engineering International, vol. 2, 2004, pp. 95-97.

Wang, "Polydimethylsiloxane mechanical properties measured by macroscopic compression and nanoindentation techniques", Graduate Theses and Dissertations, University of South Florida, 2011, 79 pages.

Weijde; "Graduation Plan", Jan. 2017; 30 Pages.

Werner; "Display Materials And Processes," Information Display; May 2015; 8 Pages.

* cited by examiner

METHOD OF FORMING A VEHICLE INTERIOR SYSTEM

CROSS-REFERENCE TO RELATED APPLICATIONS

This application claims the benefit of priority under 35 U.S.C. § 119 of U.S. Provisional Application Ser. No. 62/698,506 filed on Jul. 16, 2018, the content of which is relied upon and incorporated herein by reference in its entirety.

BACKGROUND

The disclosure relates to vehicle interior systems including a glass substrate and methods for forming the same, and more particularly to a cold-formed or cold-bent curved glass substrate and methods for forming the same.

Vehicle interiors include curved surfaces and can incorporate displays, touch panels and/or other cover glass components in such curved surfaces. The materials used to form such curved surfaces are typically limited to polymers, which do not exhibit the durability and optical performance of glass. As such, Applicant has determined that curved glass substrates are desirable, especially when used as covers for displays and/or touch panels. Existing methods of forming such curved glass substrates, such as thermal forming, have drawbacks including high cost, optical distortion, and surface marking. Applicant has identified a need for vehicle interior systems that can incorporate a curved glass substrate in a cost-effective manner and without problems typically associated with glass thermal forming processes, and while also having the mechanical performance to pass industry-standard safety tests and regulations.

SUMMARY

One embodiment of the disclosure relates to a method of forming a vehicle interior system. The method includes supporting a glass substrate within a mold cavity of a mold. The glass substrate has a first major surface and a second major surface opposite the first major surface, and the second major surface of the glass substrate faces a curved support surface within the mold. The method includes applying a force to the glass substrate causing the glass substrate to bend into conformity with a curved shape of the curved support surface such that a curved glass substrate is formed. The first major surface of the curved glass substrate includes a curved section and the second major surface of the curved glass substrate includes a curved section. The method includes delivering a liquid polymer material to the mold cavity such that the liquid polymer material contacts the first major surface of the glass substrate. The method includes solidifying the liquid polymer material within the mold cavity to form a polymer frame engaging the curved glass substrate. The method includes removing the frame and the curved glass substrate from the mold, and the engagement between the frame and the curved glass substrate maintains the curved glass substrate in the curved shape. A maximum temperature of the glass substrate during the supporting step, the applying step, the delivering step, the solidifying step and the removing step is less than a glass transition temperature of the glass substrate.

Another embodiment of the disclosure relates to a method of forming a vehicle interior system. The method includes supporting a glass substrate within a mold cavity of a mold, and the glass substrate has a first major surface and a second major surface opposite the first major surface. The method includes bending the glass substrate to a curved shape within the mold cavity such that a curved glass substrate is formed while a maximum temperature of the glass substrate is maintained below a glass transition temperature of the glass substrate. The method includes delivering a liquid polymer material to the mold cavity such that the liquid polymer material contacts the first major surface of the glass substrate. The method includes solidifying the liquid polymer material within the mold cavity to form a polymer frame engaging the curved glass substrate, and the engagement between the frame and the curved glass substrate maintains the curved glass substrate in the curved shape.

Another embodiment of the disclosure relates to a vehicle interior system. The vehicle interior system includes a polymer frame comprising a curved support surface. The vehicle interior system includes a glass substrate directly coupled to the curved support surface of the frame. The glass substrate includes a first major surface, a second major surface, a minor surface connecting the first major surface and the second major surface and a thickness in a range from 0.05 mm to 2 mm. The glass substrate has a curved shape such that the first major surface of the glass substrate includes a curved section and the second major surface of the curved glass substrate includes a curved section. The curved section of the first major surface includes a first radius of curvature greater than 30 mm and less than 5 m. The curved support surface of the frame directly engages the first major surface of the glass substrate and the engagement and a rigidity of the polymer frame maintains the curved shape of the glass substrate.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Figure 1:
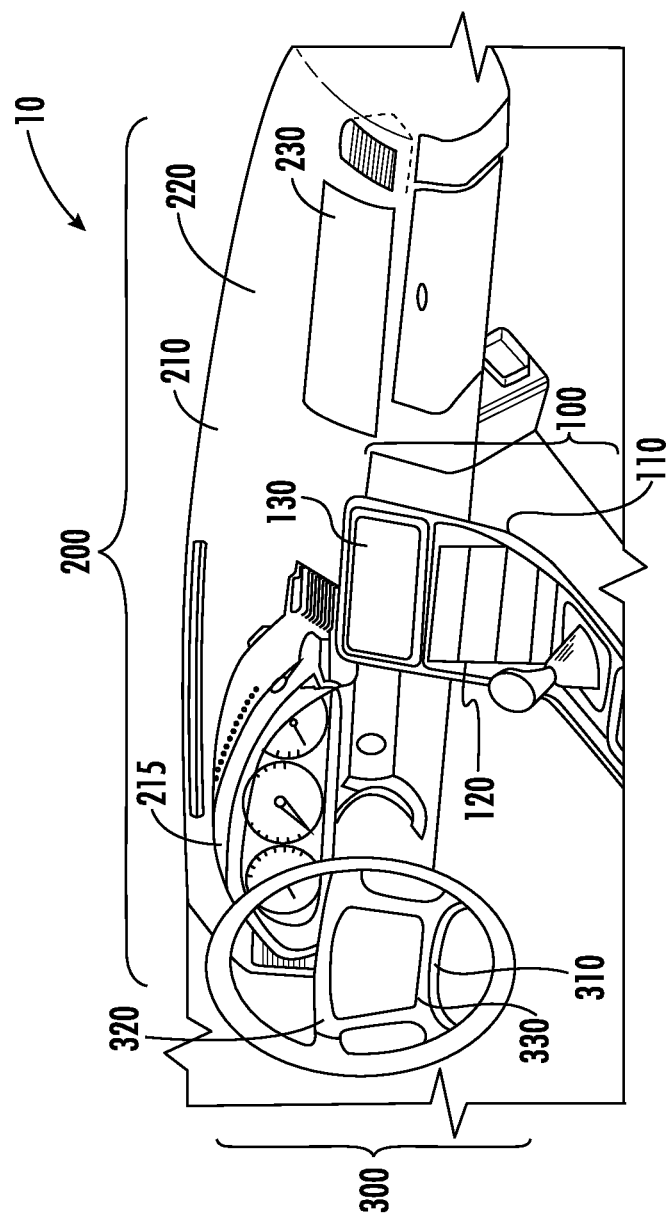
FIG. 1 is a perspective view of a vehicle interior with vehicle interior systems, according to exemplary embodiments.

Reference will now be made in detail to various embodiments, examples of which are illustrated in the accompanying drawings. In general, a vehicle interior system may include a variety of different curved surfaces that are designed to be transparent, such as curved display surfaces and curved non-display glass covers, and the present disclosure provides articles and methods for forming these curved surfaces from a glass material. Forming curved vehicle surfaces from a glass material provide a number of advantages compared to the typical curved plastic panels that are conventionally found in vehicle interiors. For example, glass is typically considered to provide enhanced functionality and user experience in many curved cover material applications, such as display applications and touch screen applications, compared to plastic cover materials.

While glass provides these benefits, glass surfaces in vehicle interiors should also meet performance criteria for both passenger safety and ease of use. For example, certain regulations (e.g., ECE R 21 & FMVSS201) require vehicle interiors to pass the Headform Impact Test (HIT). The HIT involves subjecting a vehicle interior component, such as a display, to an impact from a mass under certain specific conditions. The mass used is an anthropomorphic headform. The HIT is intended to simulate the impact of the head of a driver or passenger against the vehicle interior component. The criteria for passing the test includes the force of the deceleration of the headform not exceeding 80 g (g-force) for longer than a 3 ms period, and the peak deceleration of the headform being less than 120 g. As used in the context of the HIT, "deceleration" refers to the deceleration of the headform as it is stopped by the vehicle interior component. Besides these regulatory requirements, there are additional concerns when using glass under these conditions. For example, it may be desirable for the glass to remain intact and not fracture when subjected to the impact from the HIT. In some cases, it may be acceptable for the glass to fracture, but the fractured glass should behave in a way to reduce the chance of causing lacerations on a real human head. In the HIT, laceration potential can be simulated by wrapping the headform in a substitute material representing human skin, such as a fabric, leather, or other material. In this way, laceration potential can be estimated based on the tears or holes formed in the substitute material. Thus, in the case where the glass fractures, it may be desirable to decrease the chance of laceration by controlling how the glass fractures.

Accordingly, as will be discussed in more detail below, Applicant has developed a glass article and related manufacturing processes that provide an efficient and cost effective way to form an article, such as a display for a vehicle interior system, utilizing a cold-bent piece of glass substrate. In general, the manufacturing process discussed herein provides for cold-bending of a glass article to a curved shape and then forming (e.g., through injection molding, resin molding or similar process) a curved polymer frame directly onto the curved glass article. In this process, the polymer material of the curved polymer frame directly engages (e.g., directly bonds to) one or more surfaces of the glass article, and the engagement and rigidity of the frame hold the glass in the curved shape.

In particular embodiments, the glass substrate is bent to the curved shape within a mold (e.g., supported by a curved mold surface) via application of a force (e.g., via a vacuum chuck, electrostatic chuck, a press, etc.). While in the bent shape, a liquid polymer material is provided to the mold cavity and is in contact with a surface of the bent glass substrate. Then the polymer material is solidified (e.g., via cooling, curing or the like) to form a curved polymer frame that is in direct engagement (e.g., via bonding) with a surface of the glass substrate. The direct engagement and the rigidity of the polymer frame holds the glass substrate in the curved shape once the completed article is removed from the mold. In this process, use of a separate adhesive material is avoided, allowing the process to occur without the need of an adhesive application step. Further, by utilizing the molding technology and equipment as discussed herein, Applicant believes that high-throughput and efficient manufacture of articles including a cold-bent cover glass structure is provided in a manner not achievable with conventional hot glass bending processes.

Further in typical processes, curved glass articles are formed using hot forming processes. As discussed herein a variety of curved glass articles and processes for making the same are provided that avoid the deficiencies of the typical glass hot-forming process. For example, hot-forming processes are energy intensive and increase the cost of forming a curved glass component, relative to the cold-bending process discussed herein. In addition, hot-forming processes typically make application of glass surface treatments, such as anti-reflective coatings, significantly more difficult. For example, many coating materials cannot be applied to a flat piece of glass material prior to the hot-forming process because the coating material typically will not survive the high temperatures of the hot-forming process. Further, application of a coating material to surfaces of a curved glass substrate after hot-bending is substantially more difficult than application to a flat glass substrate. In addition, Applicant believes that by avoiding the additional high temperature heating steps needed for thermal forming, the glass articles produced via the cold-forming processes and systems discussed herein have improved optical properties and/or improved surface properties than similarly shaped glass articles made via thermal-shaping processes.

Thus, for at least these reasons, Applicant believes that the glass article and processes for making the glass articles discussed herein provide for various combinations of benefits and properties not previously achievable with either non-glass articles for vehicle systems or with previously developed glass articles.

FIG. 1 shows an exemplary vehicle interior 10 that includes three different embodiments of a vehicle interior system 100, 200, 300. Vehicle interior system 100 includes a frame, shown as center console base 110, with a curved surface 120 including a curved display 130. Vehicle interior system 200 includes a frame, shown as dashboard base 210, with a curved surface 220 including a curved display 230. The dashboard base 210 typically includes an instrument panel 215 which may also include a curved display. Vehicle interior system 300 includes a frame, shown as steering wheel base 310, with a curved surface 320 and a curved display 330. In one or more embodiments, the vehicle interior system includes a frame that is an arm rest, a pillar, a seat back, a floor board, a headrest, a door panel, or any portion of the interior of a vehicle that includes a curved surface. In other embodiments, the frame is a portion of a housing for a free-standing display (i.e., a display that is not permanently connected to a portion of the vehicle).

The embodiments of the curved glass article described herein can be used in each of vehicle interior systems 100, 200 and 300. Further, the curved glass articles discussed herein may be used as curved cover glasses for any of the curved display embodiments discussed herein, including for use in vehicle interior systems 100, 200 and/or 300. Further, in various embodiments, various non-display components of vehicle interior systems 100, 200 and 300 may be formed from the glass articles discussed herein. In some such embodiments, the glass articles discussed herein may be used as the non-display cover surface for the dashboard, center console, door panel, etc. In such embodiments, glass material may be selected based on its weight, aesthetic appearance, etc. and may be provided with a coating (e.g., an ink or pigment coating) with a pattern (e.g., a brushed metal appearance, a wood grain appearance, a leather appearance, a colored appearance, etc.) to visually match the glass components with adjacent non-glass components. In specific embodiments, such ink or pigment coating may have a transparency level that provides for deadfront functionality.

As shown in FIGS. 2-4F, formation of a curved glass article, such as the cover glass for curved display 130, is shown according to exemplary embodiments. It should be understood that while FIGS. 2-4F are described in terms of forming curved display 130, the curved glass article of FIGS. 2-4F may be used in any suitable curved glass application, including any curved glass component of any of the vehicle interior systems of FIG. 1.

Figure 2:
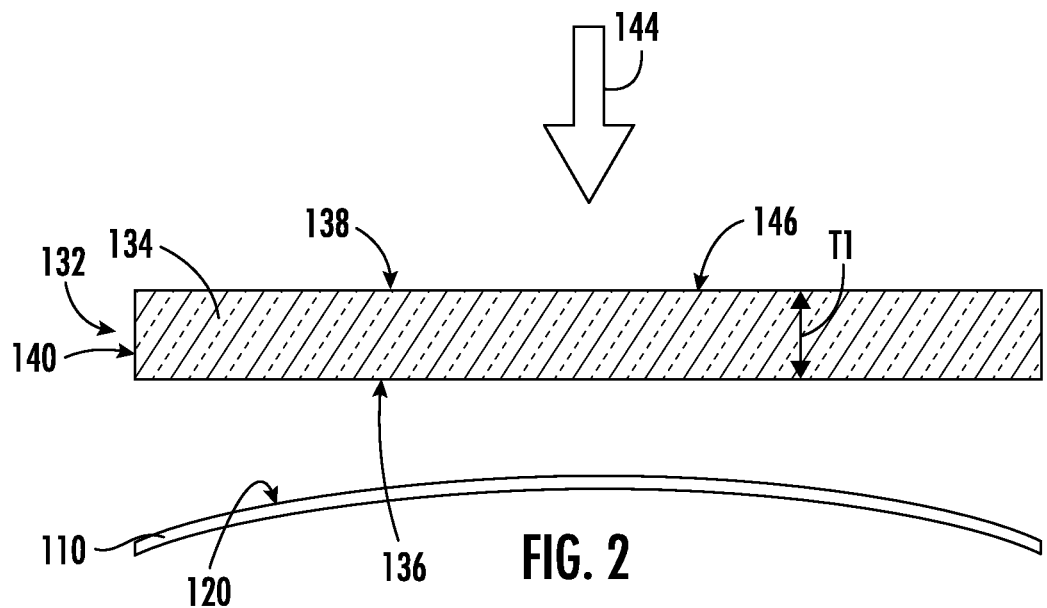
FIG. 2 is a cross-sectional, exploded view of a glass substrate prior to bending and attachment to a curved frame of a vehicle interior system, according to an exemplary embodiment.
Figure 3:
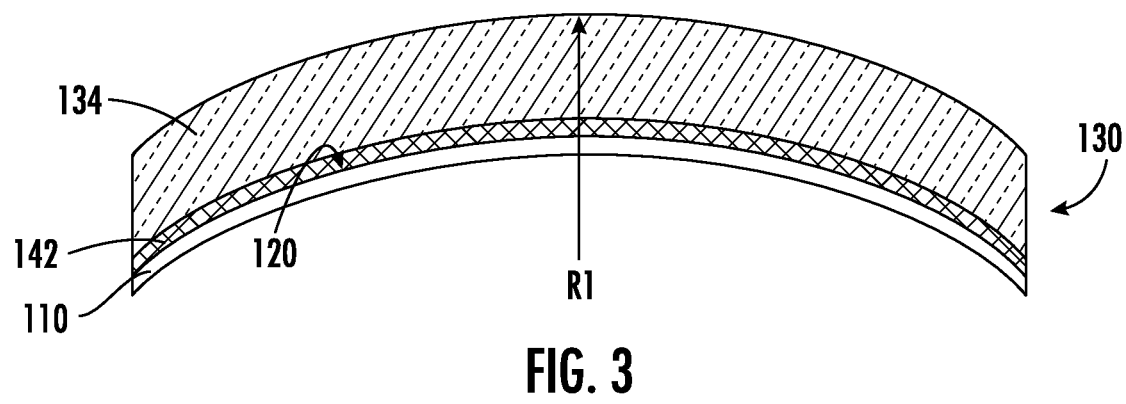
FIG. 3 is a cross-sectional view of the glass substrate of FIG. 2 following cold bending and attachment to the curved frame of FIG. 2, according to an exemplary embodiment.

Referring to FIGS. 2 and 3, a frame, shown as center console base 110, includes a curved surface, shown as curved surface 120. Display 130 includes a glass article, shown as a cover panel 132. Cover panel 132 includes a glass substrate 134. Glass substrate 134 includes a first major surface 136 and a second major surface 138 opposite first major surface 136. A minor surface 140 connects the first major surface 136 and the second major surface 138, and in specific embodiments, minor surface 140 defines the outer perimeter of glass substrate 134. An engagement structure, shown as a melt bond 142, is located between first major surface 136 of glass substrate 134 and console base 110, and as will be discussed in more detail below, bond 142 is formed from the solidification of the polymer material that forms base 110, such that a bond between glass substrate 134 and curved surface 120 of center console base 110 is formed. In some such embodiments, because of the formation of melt bond 142 during molding of base 110 directly to glass substrate 134 following bending, no structural adhesives are used to bond glass substrate 134 to base 110.

In general, cover panel 132 is cold formed or cold bent to the desired curved shape via application of a bending force 144. As shown in FIG. 3, following cold bending, cover panel 132 has a curved shape such that first major surface 136 and second major surface 138 each include at least one curved section having a radius of curvature. In the specific embodiments shown, curved surface 120 of base 110 is a convex curved surface. In such embodiments, cover panel 132 is bent such that first major surface 136 defines a concave shape that generally conforms to the convex curved shape of curved surface 120, and second major surface 138 defines a convex shape that generally matches or mirrors the convex curved shape of curved surface 120. In such embodiments, surfaces 136 and 138 both define a first radius of curvature R1 that generally matches the radius of curvature of curved surface 120 of base 110. In particular embodiments, bond 142 and the rigidity of base 110 (following solidification) holds glass substrate 134 in the curved shape following removal of bending force 144.

In general, R1 is selected based on the shape of the associated vehicle interior frame, and in general R1 is between 30 mm and 5 m. In addition, glass substrate 134 has a thickness T1 (e.g., an average thickness measured between surfaces 136 and 138) shown in FIG. 2 that is in a range from 0.05 mm to 2 mm. In specific embodiments, T1 is less than or equal to 1.5 mm and in more specific embodiments, T1 is 0.3 mm to 0.7 mm. Applicant has found that such thin glass substrates can be cold formed to a variety of curved shapes (including the relatively high curvature radii of curvature discussed herein) utilizing cold forming without breakage while at the same time providing for a high quality cover layer for a variety of vehicle interior applications. In addition, such a thin glass substrate 134 may deform more readily, which could potentially compensate for shape mismatches and gaps that may exist relative to curved surface 120 and/or center console base 110.

In various embodiments, first major surface 136 and/or the second major surface 138 of glass substrate includes one or more surface treatments or layers, shown as surface treatment 146. Surface treatment 146 may cover at least a portion of the first major surface 136 and/or second major surface 138. Exemplary surface treatments include anti-glare surfaces/coatings, anti-reflective surfaces/coatings, and a pigment design. In one or more embodiments, at least a portion of the first major surface 136 and/or the second major surface 138 may include any one, any two or all three of an anti-glare surface, an anti-reflective surface, and a pigment design. For example, first major surface 136 may include an anti-glare surface and second major surface 138 may include an anti-reflective surface. In another example, first major surface 136 includes an anti-reflective surface and second major surface 138 includes an anti-glare surface. In yet another example, major surface 138 comprises either one of or both the anti-glare surface and the anti-reflective surface, and second major surface 136 includes the pigment design. As will be discussed in more detail below, in at least some embodiments, the material of base 110 contacts and/or bonds to the layer of glass substrate 134 that defines surface 136.

The pigment design may include any aesthetic design formed from a pigment (e.g., ink, paint and the like) and can include a wood-grain design, a brushed metal design, a graphic design, a portrait, or a logo. The pigment design may be printed onto the glass substrate. In one or more embodiments, the anti-glare surface includes an etched surface. In one or more embodiments, the anti-reflective surface includes a multi-layer coating.

Referring to FIGS. 4A-4F, a method of cold forming a glass article, such as cover panel 132 for display 130, and an associated curved frame is shown. As used herein, the terms "cold-bent," "cold bending," "cold-formed" or "cold forming" refers to curving the glass substrate at a cold-form temperature which is less than the glass transition temperature of the glass material of glass substrate 134.

Figure 4C:
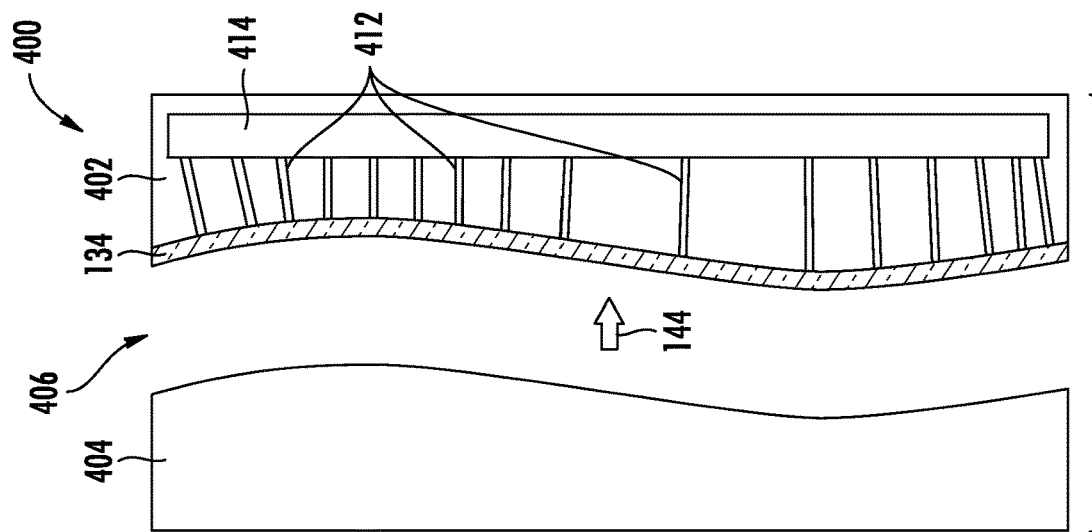
FIGS. 4A-4F show a process for cold-bending a glass substrate and formation of a curved frame, according to an exemplary embodiment.
Figure 4B:
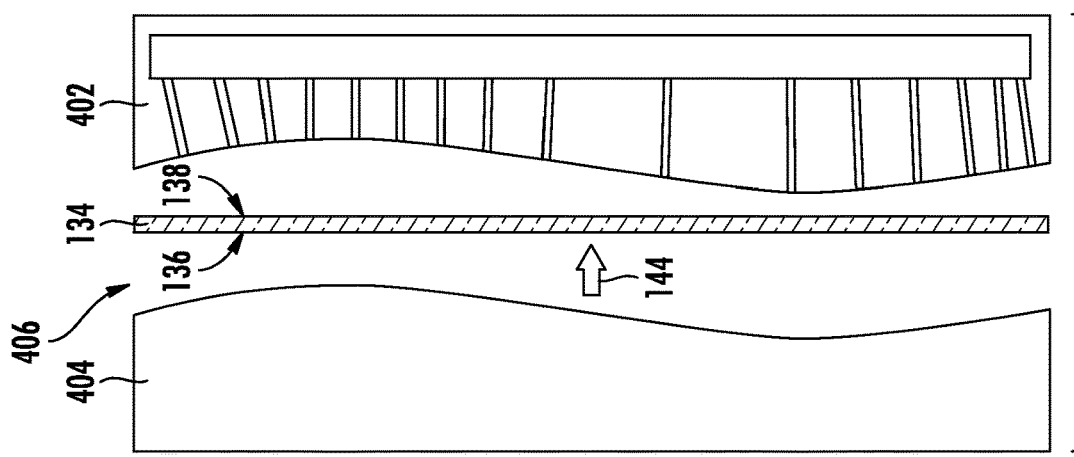
Figure 4A:
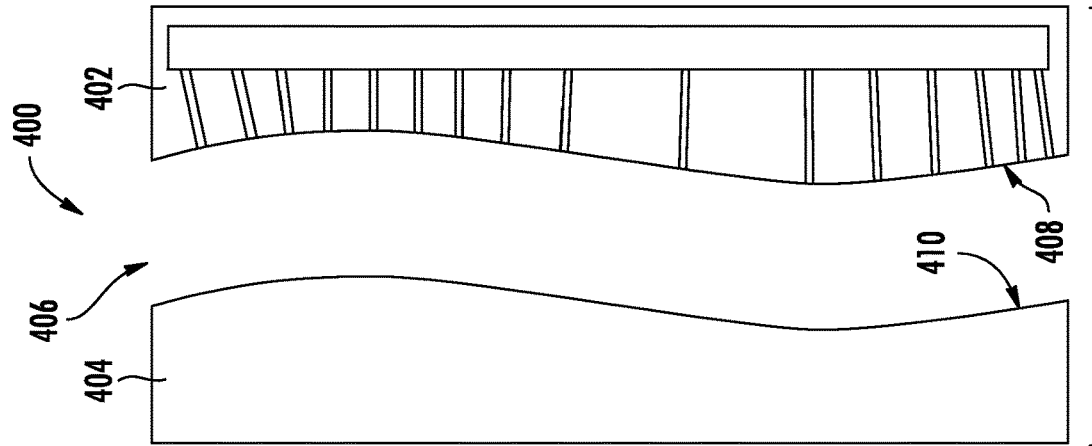

As shown in FIG. 4A, a mold 400 includes a first mold body 402 and a second mold body 404. A mold cavity 406 is defined between opposing surfaces 408 and 410 of mold bodies 402 and 404, respectively. As can be seen in FIG. 4A, surfaces 408 and 410 have complementary curved shapes used to form the desired curved shapes of the frame and of the glass substrate as discussed herein.

As shown in FIGS. 4B and 4C, glass substrate 134 is placed within mold cavity 406 such that it is supported such that first major surface 136 faces mold surface 410 and second major surface 138 faces mold surface 408. As shown in FIG. 4C, while glass substrate 134 is supported within mold 400, force 144 is applied to glass substrate 134 causing glass substrate 134 to bend into substantial conformity with the curved mold surface 408 (e.g., R1 is within 10% of the radius of curved mold surface 408). It should be understood that while FIG. 4 shows glass substrate 134 supported directly by mold surface 408 during application of force 144, in other embodiments, glass substrate 134 may be supported via a separate support structure including a curved support structure located within mold cavity 406.

As shown in FIG. 4C, application of force 144 causes glass substrate 134 to adopt a curved shape, such as the shape shown in FIG. 4C and/or described in various embodiments herein. During application of force 144 and throughout the process shown in FIGS. 4A-4F, a maximum temperature of glass substrate 134 is less than a glass transition temperature of the glass material of glass substrate 134. In a particular embodiment, the glass substrate is not actively heated via a heating element, furnace, oven, etc. during bending, as is the case when applying hot-forming glass to a curved shape. In various embodiments, the temperature of the glass substrate 134 is maintained below 400 degrees C., 300 degrees C., 200 degrees C. or even 100 degrees C. during the process shown in FIGS. 4A-4F and in particular during the application of the bending force. In particular, Applicant believes that this approach allows for formation of a curved glass substrate while preserving various coatings located on the glass substrate that can be damaged or destroyed at high temperatures typically associated with glass bending processes.

Force 144 may be applied by a variety of suitable mechanisms to form glass substrate 134 to the curved shape shown in FIG. 4C. In a specific embodiment, force 144 is created by applying an air pressure differential across glass substrate 134 within mold cavity 406. In some embodiments, the air pressure differential is formed via a vacuum chuck. In other embodiments, force 144 may be generated via other suitable mechanisms, such as a mechanical press, a vacuum chuck, an electrostatic chuck, etc.

Referring to FIGS. 4B and 4C, in the specific embodiment shown, mold 400 is configured to apply a vacuum or suction to glass substrate 134 to bend substrate 134 into the curved shape while within mold cavity 406. In one such embodiment, mold body 402 includes a plurality of channels 412 fluidly coupled to a vacuum or suction system shown schematically as 414. In this manner an air pressure differential across substrate 134 is formed bending substrate 134 in to conformity with surface 408 of mold body 402. In some such embodiments, glass substrate 134 blocks channels 412 such that the liquid polymer is not drawn into channels 412.

Figure 4F:
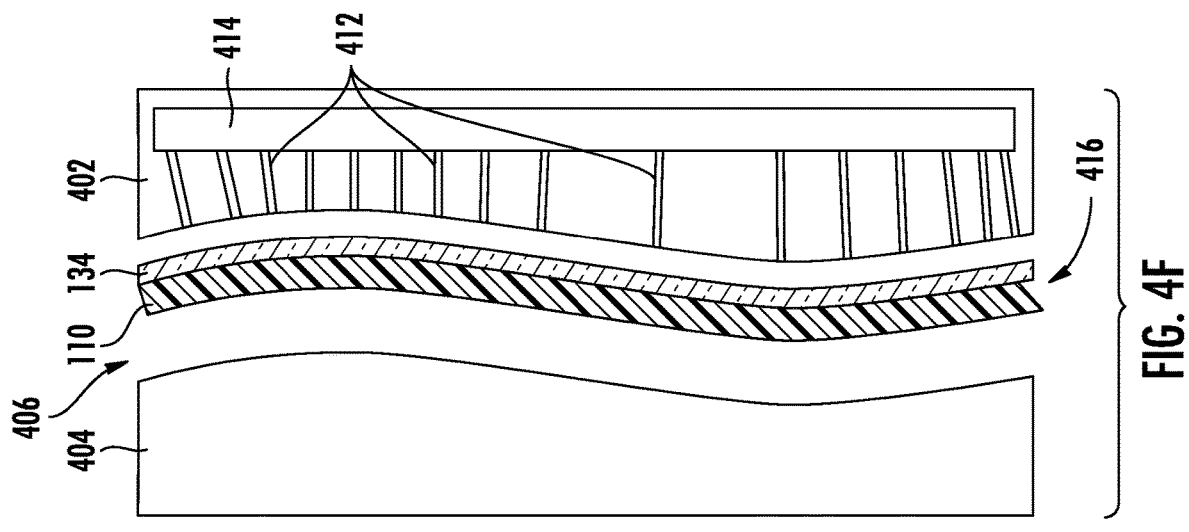
Figure 4E:
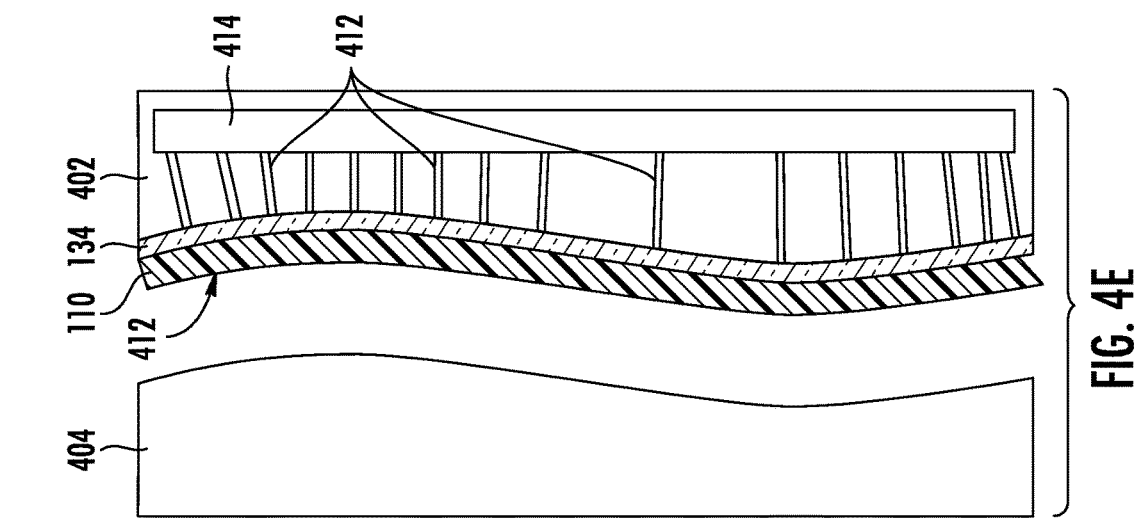
Figure 4D:
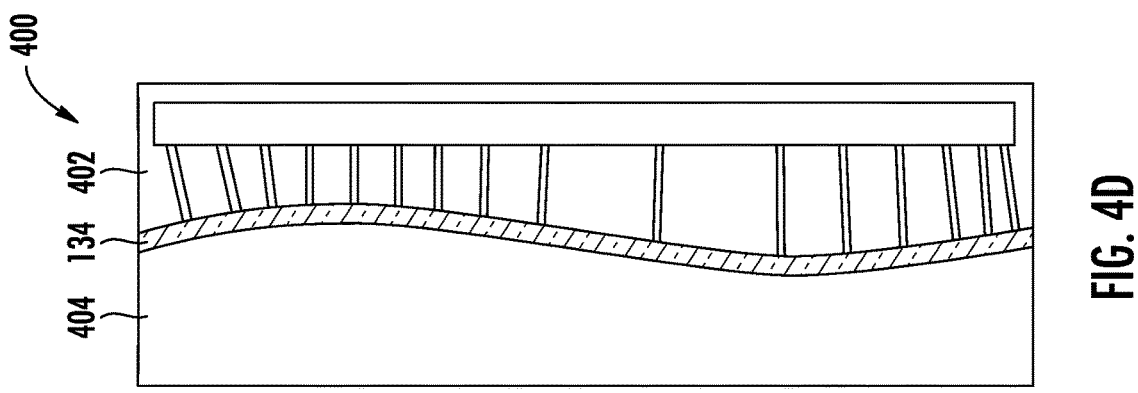

Referring to FIGS. 4D and 4E, before, during and/or after application of force 144, mold 400 is closed around glass substrate 134 while glass substrate 134 is maintained in the curved shape. With mold 400 closed, a liquid polymer material is delivered to mold cavity 406, such that the liquid polymer material is in contact with at least first major surface 136 of glass substrate 134. Next, as shown in FIG. 4E, the liquid polymer material is solidified within the mold cavity to form a frame, such as console base 110, that engages the curved glass substrate. In some embodiments, the solidification of the liquid polymer material while in contact with glass substrate 134 forms a bond, such as melt bond 142 shown in FIG. 3, between surface 136 of glass substrate 134 and base 110. In such embodiments, the bond may be formed directly between the polymer material of base 110 and the material of glass substrate 134 that defines first major surface 136, which may be the glass material itself or a coating layer or material located on glass substrate 134. As will be appreciated, in contrast to assemblies that utilize an adhesive to bond a polymer frame to a cover glass component, the polymer material of melt bond 142 is the same as the material that forms the rest of base 110, and melt bond 142 is formed from a single, contiguous, continuous piece of polymer material with the rest of base 110.

In some embodiments, the liquid polymer material may be a thermoplastic material that is solidified to form base 110 via cooling. In such embodiments, mold body 402 and/or mold body 404 may include a cooling system, such as channels for conveying cooling liquid or gas through mold bodies 402 and/or 404 to facilitate the quick solidification of the liquid polymer material to form base 110. In such embodiments, the mold cooling system also facilitates the maintenance of the temperature of glass substrate below the maximum temperatures discussed herein. In other embodiments, the liquid polymer material may be a polymer material that is cured via cross-linking, such as via UV curing. The liquid polymer material may be a variety of suitable polymer materials for forming base 110, such as polyethylene, polypropylene, polycarbonate-ABS, thermoplastic elastomer, etc.

Following solidification, mold 400 is opened by moving mold body 402 and 404 away from each other. As shown in FIG. 4F, the glass and frame component, shown as component 416, is separated from mold 400, and is removed from mold 400. Following removal from mold 400, component 416 is assembled into the desired device, display, vehicle interior system, etc.

Following opening of mold 400, force 144 is no longer applied to glass substrate 134 to maintain the curved shape, but the engagement between the solidified polymer material of base 110 and the glass and/or the rigidity of the material of base 110 maintains or holds glass substrate 134 in the curved shape as shown in FIG. 4F. In some embodiments, the engagement between base 110 and glass substrate 134 may include a mechanical retaining feature such as a capture collar instead of or in addition to the melt bond 142 discussed above. In such embodiments, the mechanical structure is directly molded around glass substrate 134 within mold 400 without the use of adhesives.

Mold bodies 402 and 404 may be formed from a variety of suitable materials. In various embodiments, mold bodies 402 and/or 404 may be formed from plastic materials (e.g., PC-ABS, PVC, Delrin, etc.) or metals (e.g., aluminum alloys, iron alloys, etc.). In various embodiments, surface 408 of mold body 402 includes a coating material that limits or prevents scratches on glass substrate 134 during bending and molding of base 110. Similarly, in various embodiments surface 410 of mold body 404 includes a coating material that limits or prevents scratches on base 110 during molding.

In various embodiments, glass substrate 134 is formed from a strengthened glass sheet (e.g., a thermally strengthened glass material, a chemically strengthened glass sheet, etc.) In such embodiments, when glass substrate 134 is formed from a strengthened glass material, first major surface 136 and second major surface 138 are under compressive stress, and thus major surface 138 can experience greater tensile stress during bending to the convex shape without risking fracture. This allows for strengthened glass substrate 134 to conform to more tightly curved surfaces.

A feature of a cold-formed glass substrate is an asymmetric surface compressive between the first major surface 136 and the second major surface 138 once the glass substrate has been bent to the curved shape. In such embodiments, prior to the cold-forming process or being cold-formed, the respective compressive stresses in the first major surface 136 and the second major surface 138 of glass substrate 134 are substantially equal. After cold-forming, the compressive stress on concave major surface 136 increases such that the compressive stress on the major surface 136 is greater after cold-forming than before cold-forming. In contrast, convex major surface 138 experiences tensile stresses during bending causing a net decrease in surface compressive stress on surface 138, such that the compressive stress in surface 138 following bending is less than the compressive stress in surface 138 when the glass sheet is flat.

As noted above, in addition to providing processing advantages such as eliminating expensive and/or slow heating steps, the cold-forming processes discussed herein are believed to generate curved glass articles with a variety of properties that are superior to hot-formed glass articles, particularly for vehicle interior or display cover glass applications. For example, Applicant believes that, for at least some glass materials, heating during hot-forming processes decreases optical properties of curved glass sheets, and thus, the curved glass substrates formed utilizing the cold-bending processes/systems discussed herein provide for both curved glass shapes along with improved optical qualities not believed achievable with hot-bending processes.

Further, many glass surface treatments (e.g., anti-glare coatings, anti-reflective coatings, etc.) are applied via deposition processes, such as sputtering processes that are typically ill-suited for coating curved glass articles. In addition, many surface treatments (e.g., anti-glare coatings, anti-reflective coatings, decorative coatings, etc.) also are not able to survive the high temperatures associated with hot-bending processes. Thus, in particular embodiments discussed herein, one or more surface treatments are applied to major surface 136 and/or to major surface 138 of glass substrate 134 prior to cold-bending, and glass substrate 134 including the surface treatment is bent to a curved shape as discussed herein. Thus, Applicant believes that the processes and systems discussed herein allow for bending of glass after one or more coating materials have been applied to the glass, in contrast to typical hot-forming processes.

It should be noted that in FIG. 3, glass substrate 134 is shown having a single curvature such that major surface 138 has a single convex radius of curvature and major surface 136 has a single concave radius of curvature. However, the method discussed herein allows for glass substrate 134 to be bent to more complex shapes. For example, as shown in FIG. 4F, glass substrate 134 is bent to a shape such that major surface 136 has both convex and concave curved sections, and major surface 138 has both convex and concaved curved sections, forming an S-shaped glass substrate when viewed in cross-section.

In various embodiments, a cold-formed glass substrate 134 may have a compound curve including a major radius and a cross curvature. A complexly curved cold-formed glass substrate 134 may have a distinct radius of curvature in two independent directions. According to one or more embodiments, a complexly curved cold-formed glass substrate 134 may thus be characterized as having "cross curvature," where the cold-formed glass substrate 134 is curved along an axis (i.e., a first axis) that is parallel to a given dimension and also curved along an axis (i.e., a second axis) that is perpendicular to the same dimension. The curvature of the cold-formed glass substrate and the curved display can be even more complex when a significant minimum radius is combined with a significant cross curvature, and/or depth of bend. In various embodiments, glass substrate 134 can have more than two curved regions with the same or differing curved shapes. In some embodiments, glass substrate 134 can have one or more region having a curved shape with a variable radius of curvature.

Figure 5:
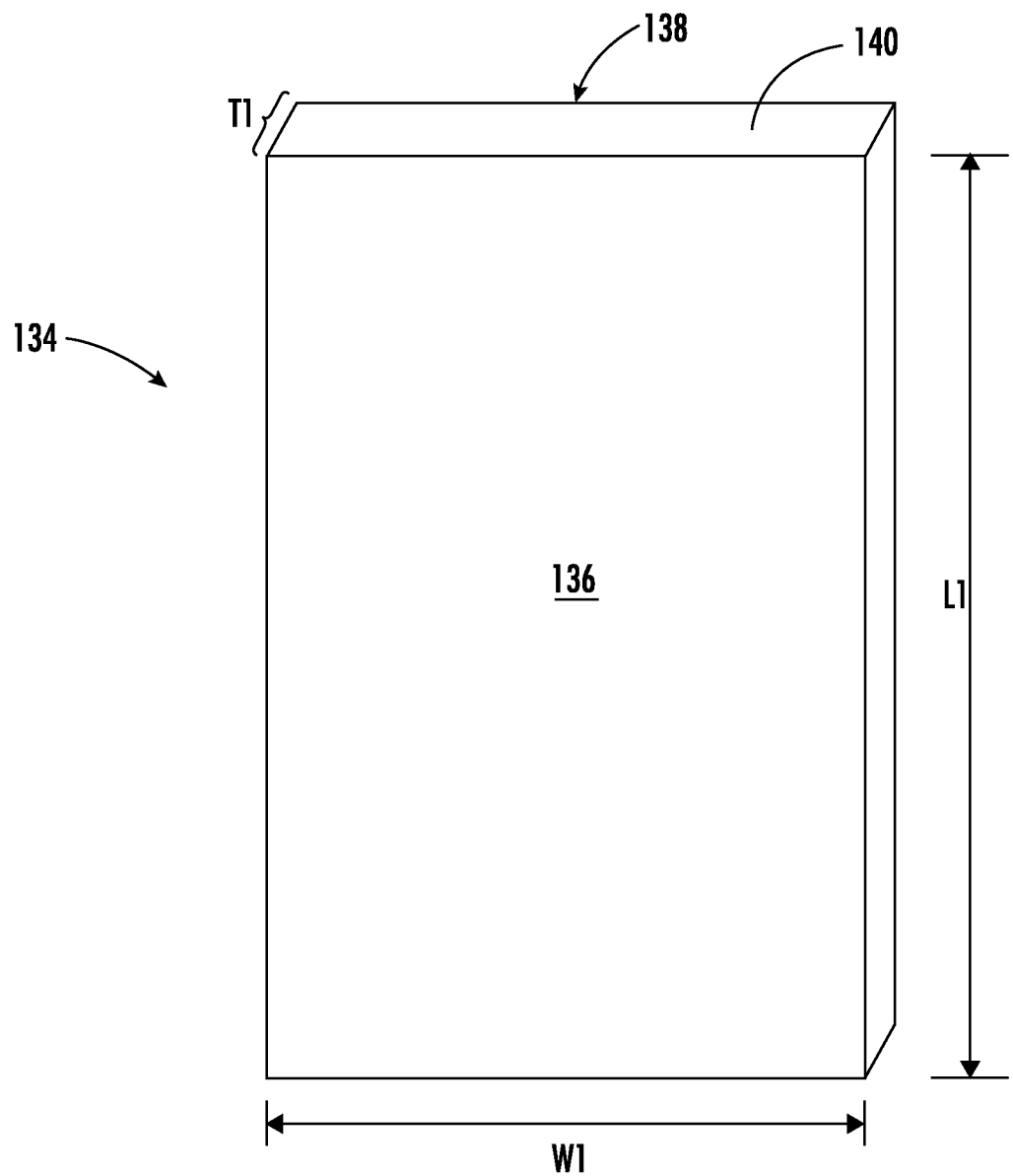
FIG. 5 is a front perspective view of the glass substrate of FIGS. 2-4F, according to an exemplary embodiment.

Referring to FIG. 5, additional structural details of glass substrate 134 are shown and described. As noted above, glass substrate 134 has a thickness T1 that is substantially constant and is defined as a distance between the first major surface 136 and the second major surface 138. In various embodiments, T1 may refer to an average thickness or a maximum thickness of the glass substrate. In addition, glass substrate 134 includes a width W1 defined as a first maximum dimension of one of the first or second major surfaces orthogonal to the thickness T1, and a length L1 defined as a second maximum dimension of one of the first or second surfaces orthogonal to both the thickness and the width. In other embodiments, W1 and L1 may be the average width and the average length of glass substrate 134, respectively.

In various embodiments, thickness T1 is 2 mm or less and specifically is 0.3 mm to 1.1 mm. For example, thickness T1 may be in a range from about 0.1 mm to about 1.5 mm, from about 0.15 mm to about 1.5 mm, from about 0.2 mm to about 1.5 mm, from about 0.25 mm to about 1.5 mm, from about 0.3 mm to about 1.5 mm, from about 0.35 mm to about 1.5 mm, from about 0.4 mm to about 1.5 mm, from about 0.45 mm to about 1.5 mm, from about 0.5 mm to about 1.5 mm, from about 0.55 mm to about 1.5 mm, from about 0.6 mm to about 1.5 mm, from about 0.65 mm to about 1.5 mm, from about 0.7 mm to about 1.5 mm, from about 0.1 mm to about 1.4 mm, from about 0.1 mm to about 1.3 mm, from about 0.1 mm to about 1.2 mm, from about 0.1 mm to about 1.1 mm, from about 0.1 mm to about 1.05 mm, from about 0.1 mm to about 1 mm, from about 0.1 mm to about 0.95 mm, from about 0.1 mm to about 0.9 mm, from about 0.1 mm to about 0.85 mm, from about 0.1 mm to about 0.8 mm, from about 0.1 mm to about 0.75 mm, from about 0.1 mm to about 0.7 mm, from about 0.1 mm to about 0.65 mm, from about 0.1 mm to about 0.6 mm, from about 0.1 mm to about 0.55 mm, from about 0.1 mm to about 0.5 mm, from about 0.1 mm to about 0.4 mm, or from about 0.3 mm to about 0.7 mm. In other embodiments, the T1 falls within any one of the exact numerical ranges set forth in this paragraph.

In various embodiments, width W1 is in a range from 5 cm to 250 cm, from about 10 cm to about 250 cm, from about 15 cm to about 250 cm, from about 20 cm to about 250 cm, from about 25 cm to about 250 cm, from about 30 cm to about 250 cm, from about 35 cm to about 250 cm, from about 40 cm to about 250 cm, from about 45 cm to about 250 cm, from about 50 cm to about 250 cm, from about 55 cm to about 250 cm, from about 60 cm to about 250 cm, from about 65 cm to about 250 cm, from about 70 cm to about 250 cm, from about 75 cm to about 250 cm, from about 80 cm to about 250 cm, from about 85 cm to about 250 cm, from about 90 cm to about 250 cm, from about 95 cm to about 250 cm, from about 100 cm to about 250 cm, from about 110 cm to about 250 cm, from about 120 cm to about 250 cm, from about 130 cm to about 250 cm, from about 140 cm to about 250 cm, from about 150 cm to about 250 cm, from about 5 cm to about 240 cm, from about 5 cm to about 230 cm, from about 5 cm to about 220 cm, from about 5 cm to about 210 cm, from about 5 cm to about 200 cm, from about 5 cm to about 190 cm, from about 5 cm to about 180 cm, from about 5 cm to about 170 cm, from about 5 cm to about 160 cm, from about 5 cm to about 150 cm, from about 5 cm to about 140 cm, from about 5 cm to about 130 cm, from about 5 cm to about 120 cm, from about 5 cm to about 110 cm, from about 5 cm to about 110 cm, from about 5 cm to about 100 cm, from about 5 cm to about 90 cm, from about 5 cm to about 80 cm, or from about 5 cm to about 75 cm. In other embodiments, W1 falls within any one of the exact numerical ranges set forth in this paragraph.

In various embodiments, length L1 is in a range from about 5 cm to about 250 cm, from about 10 cm to about 250 cm, from about 15 cm to about 250 cm, from about 20 cm to about 250 cm, from about 25 cm to about 250 cm, from about 30 cm to about 250 cm, from about 35 cm to about 250 cm, from about 40 cm to about 250 cm, from about 45 cm to about 250 cm, from about 50 cm to about 250 cm, from about 55 cm to about 250 cm, from about 60 cm to about 250 cm, from about 65 cm to about 250 cm, from about 70 cm to about 250 cm, from about 75 cm to about 250 cm, from about 80 cm to about 250 cm, from about 85 cm to about 250 cm, from about 90 cm to about 250 cm, from about 95 cm to about 250 cm, from about 100 cm to about 250 cm, from about 110 cm to about 250 cm, from about 120 cm to about 250 cm, from about 130 cm to about 250 cm, from about 140 cm to about 250 cm, from about 150 cm to about 250 cm, from about 5 cm to about 240 cm, from about 5 cm to about 230 cm, from about 5 cm to about 220 cm, from about 5 cm to about 210 cm, from about 5 cm to about 200 cm, from about 5 cm to about 190 cm, from about 5 cm to about 180 cm, from about 5 cm to about 170 cm, from about 5 cm to about 160 cm, from about 5 cm to about 150 cm, from about 5 cm to about 140 cm, from about 5 cm to about 130 cm, from about 5 cm to about 120 cm, from about 5 cm to about 110 cm, from about 5 cm to about 100 cm, from about 5 cm to about 90 cm, from about 5 cm to about 80 cm, or from about 5 cm to about 75 cm. In other embodiments, L1 falls within any one of the exact numerical ranges set forth in this paragraph.

In various embodiments, one or more radius of curvature (e.g., R1 shown in FIG. 3) of glass substrate 134 is about 60 mm or greater. For example, R1 may be in a range from about 60 mm to about 1500 mm, from about 70 mm to about 1500 mm, from about 80 mm to about 1500 mm, from about 90 mm to about 1500 mm, from about 100 mm to about 1500 mm, from about 120 mm to about 1500 mm, from about 140 mm to about 1500 mm, from about 150 mm to about 1500 mm, from about 160 mm to about 1500 mm, from about 180 mm to about 1500 mm, from about 200 mm to about 1500 mm, from about 220 mm to about 1500 mm, from about 240 mm to about 1500 mm, from about 250 mm to about 1500 mm, from about 260 mm to about 1500 mm, from about 270 mm to about 1500 mm, from about 280 mm to about 1500 mm, from about 290 mm to about 1500 mm, from about 300 mm to about 1500 mm, from about 350 mm to about 1500 mm, from about 400 mm to about 1500 mm, from about 450 mm to about 1500 mm, from about 500 mm to about 1500 mm, from about 550 mm to about 1500 mm, from about 600 mm to about 1500 mm, from about 650 mm to about 1500 mm, from about 700 mm to about 1500 mm, from about 750 mm to about 1500 mm, from about 800 mm to about 1500 mm, from about 900 mm to about 1500 mm, from about 950 mm to about 1500 mm, from about 1000 mm to about 1500 mm, from about 1250 mm to about 1500 mm, from about 60 mm to about 1400 mm, from about 60 mm to about 1300 mm, from about 60 mm to about 1200 mm, from about 60 mm to about 1100 mm, from about 60 mm to about 1000 mm, from about 60 mm to about 950 mm, from about 60 mm to about 900 mm, from about 60 mm to about 850 mm, from about 60 mm to about 800 mm, from about 60 mm to about 750 mm, from about 60 mm to about 700 mm, from about 60 mm to about 650 mm, from about 60 mm to about 600 mm, from about 60 mm to about 550 mm, from about 60 mm to about 500 mm, from about 60 mm to about 450 mm, from about 60 mm to about 400 mm, from about 60 mm to about 350 mm, from about 60 mm to about 300 mm, or from about 60 mm to about 250 mm. In other embodiments, R1 falls within any one of the exact numerical ranges set forth in this paragraph.

Figure 6:
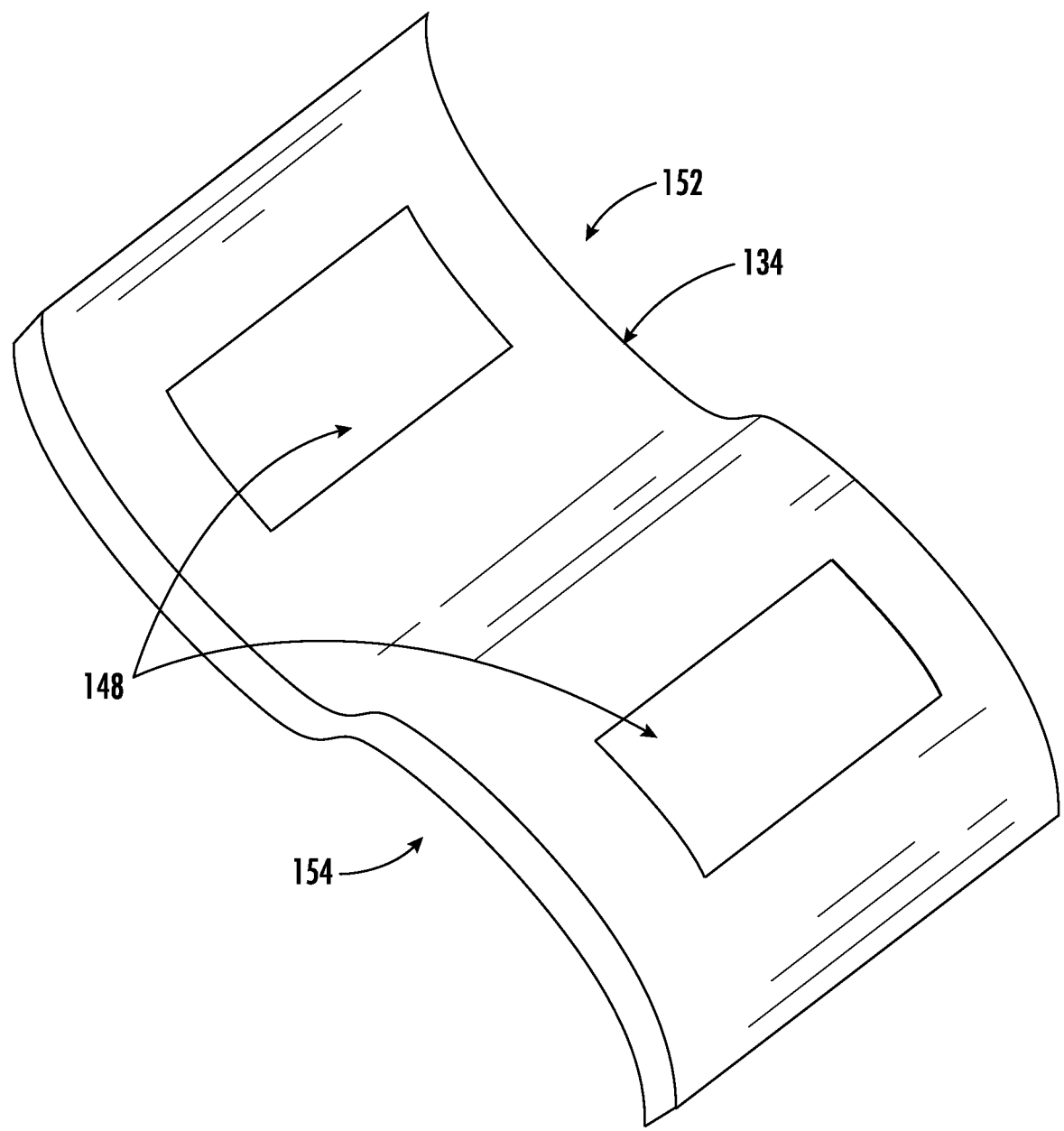
FIG. 6 is a perspective view of a curved glass substrate with multiple convex and concave curved surfaces, according to an exemplary embodiment.

As shown in FIG. 6, glass substrate 134 can include one or more regions 148 intended to show a display (e.g., an electronic display). In addition, a glass substrate according to some embodiments can be curved in multiple regions 152 and 154 of the glass substrate and in multiple directions (i.e., the glass substrate can be curved about different axes that may or may not be parallel) as shown in FIG. 6. Accordingly, shapes and forms of the possible embodiments are not limited to the examples shown herein. Glass substrate 134 can be shaped to have a complex surface including multiple different shapes including one or more flat sections, one or more conical sections, one or more cylindrical sections, one or more spherical sections, etc.

The various embodiments of the vehicle interior system may be incorporated into vehicles such as trains, automobiles (e.g., cars, trucks, buses and the like), sea craft (boats, ships, submarines, and the like), and aircraft (e.g., drones, airplanes, jets, helicopters and the like).

Strengthened Glass Properties

As noted above, glass substrate 134 may be strengthened. In one or more embodiments, glass substrate 134 may be strengthened to include compressive stress that extends from a surface to a depth of compression (DOC). The compressive stress regions are balanced by a central portion exhibiting a tensile stress. At the DOC, the stress crosses from a positive (compressive) stress to a negative (tensile) stress.

In various embodiments, glass substrate 134 may be strengthened mechanically by utilizing a mismatch of the coefficient of thermal expansion between portions of the article to create a compressive stress region and a central region exhibiting a tensile stress. In some embodiments, the glass substrate may be strengthened thermally by heating the glass to a temperature above the glass transition point and then rapidly quenching.

In various embodiments, glass substrate 134 may be chemically strengthened by ion exchange. In the ion exchange process, ions at or near the surface of the glass substrate are replaced by—or exchanged with—larger ions having the same valence or oxidation state. In those embodiments in which the glass substrate comprises an alkali aluminosilicate glass, ions in the surface layer of the article and the larger ions are monovalent alkali metal cations, such as $Li^+$, $Na^+$, $K^+$, $Rb^+$, and $Cs^+$. Alternatively, monovalent cations in the surface layer may be replaced with monovalent cations other than alkali metal cations, such as $Ag^+$ or the like. In such embodiments, the monovalent ions (or cations) exchanged into the glass substrate generate a stress.

Ion exchange processes are typically carried out by immersing a glass substrate in a molten salt bath (or two or more molten salt baths) containing the larger ions to be exchanged with the smaller ions in the glass substrate. It should be noted that aqueous salt baths may also be utilized. In addition, the composition of the bath(s) may include more than one type of larger ions (e.g., Na+ and K+) or a single larger ion. It will be appreciated by those skilled in the art that parameters for the ion exchange process, including, but not limited to, bath composition and temperature, immersion time, the number of immersions of the glass substrate in a salt bath (or baths), use of multiple salt baths, additional steps such as annealing, washing, and the like, are generally determined by the composition of the glass substrate (including the structure of the article and any crystalline phases present) and the desired DOC and CS of the glass substrate that results from strengthening. Exemplary molten bath compositions may include nitrates, sulfates, and chlorides of the larger alkali metal ion. Typical nitrates include $KNO_3$, $NaNO_3$, $LiNO_3$, $NaSO_4$ and combinations thereof. The temperature of the molten salt bath typically is in a range from about 380° C. up to about 450° C., while immersion times range from about 15 minutes up to about 100 hours depending on glass substrate thickness, bath temperature and glass (or monovalent ion) diffusivity. However, temperatures and immersion times different from those described above may also be used.

In one or more embodiments, the glass substrates may be immersed in a molten salt bath of 100% $NaNO_3$, 100% $KNO_3$, or a combination of $NaNO_3$ and $KNO_3$ having a temperature from about 370° C. to about 480° C. In some embodiments, the glass substrate may be immersed in a molten mixed salt bath including from about 5% to about 90% $KNO_3$ and from about 10% to about 95% $NaNO_3$. In one or more embodiments, the glass substrate may be immersed in a second bath, after immersion in a first bath. The first and second baths may have different compositions and/or temperatures from one another. The immersion times in the first and second baths may vary. For example, immersion in the first bath may be longer than the immersion in the second bath.

In one or more embodiments, the glass substrate may be immersed in a molten, mixed salt bath including $NaNO_3$ and $KNO_3$ (e.g., 49%/51%, 50%/50%, 51%/49%) having a temperature less than about 420° C. (e.g., about 400° C. or about 380° C.), for less than about 5 hours, or even about 4 hours or less.

Ion exchange conditions can be tailored to provide a "spike" or to increase the slope of the stress profile at or near the surface of the resulting glass substrate. The spike may result in a greater surface CS value. This spike can be achieved by a single bath or multiple baths, with the bath(s) having a single composition or mixed composition, due to the unique properties of the glass compositions used in the glass substrates described herein.

In one or more embodiments, where more than one monovalent ion is exchanged into the glass substrate, the different monovalent ions may exchange to different depths within the glass substrate (and generate different magnitudes stresses within the glass substrate at different depths). The resulting relative depths of the stress-generating ions can be determined and cause different characteristics of the stress profile.

CS is measured using those means known in the art, such as by surface stress meter (FSM) using commercially available instruments such as the FSM-6000, manufactured by Orihara Industrial Co., Ltd. (Japan). Surface stress measurements rely upon the accurate measurement of the stress optical coefficient (SOC), which is related to the birefringence of the glass. SOC in turn is measured by those methods that are known in the art, such as fiber and four point bend methods, both of which are described in ASTM standard C770-98 (2013), entitled "Standard Test Method for Measurement of Glass Stress-Optical Coefficient," the contents of which are incorporated herein by reference in their entirety, and a bulk cylinder method. As used herein CS may be the "maximum compressive stress" which is the highest compressive stress value measured within the compressive stress layer. In some embodiments, the maximum compressive stress is located at the surface of the glass substrate. In other embodiments, the maximum compressive stress may occur at a depth below the surface, giving the compressive profile the appearance of a "buried peak."

DOC may be measured by FSM or by a scattered light polariscope (SCALP) (such as the SCALP-04 scattered light polariscope available from Glasstress Ltd., located in Tallinn Estonia), depending on the strengthening method and conditions. When the glass substrate is chemically strengthened by an ion exchange treatment, FSM or SCALP may be used depending on which ion is exchanged into the glass substrate. Where the stress in the glass substrate is generated by exchanging potassium ions into the glass substrate, FSM is used to measure DOC. Where the stress is generated by exchanging sodium ions into the glass substrate, SCALP is used to measure DOC. Where the stress in the glass substrate is generated by exchanging both potassium and sodium ions into the glass, the DOC is measured by SCALP, since it is believed the exchange depth of sodium indicates the DOC and the exchange depth of potassium ions indicates a change in the magnitude of the compressive stress (but not the change in stress from compressive to tensile); the exchange depth of potassium ions in such glass substrates is measured by FSM. Central tension or CT is the maximum tensile stress and is measured by SCALP.

In one or more embodiments, the glass substrate may be strengthened to exhibit a DOC that is described as a fraction of the thickness T1 of the glass substrate (as described herein). For example, in one or more embodiments, the DOC may be equal to or greater than about 0.05T1, equal to or greater than about 0.1T1, equal to or greater than about 0.11T1, equal to or greater than about 0.12T1, equal to or greater than about 0.13T1, equal to or greater than about 0.14T1, equal to or greater than about 0.15T1, equal to or greater than about 0.16T1, equal to or greater than about 0.17T1, equal to or greater than about 0.18T1, equal to or greater than about 0.19T1, equal to or greater than about 0.2T1, equal to or greater than about 0.21T1. In some embodiments, the DOC may be in a range from about 0.08T1 to about 0.25T1, from about 0.09T1 to about 0.25T1, from about 0.18T1 to about 0.25T1, from about 0.11T1 to about 0.25T1, from about 0.12T1 to about 0.25T1, from about 0.13T1 to about 0.25T1, from about 0.14T1 to about 0.25T1, from about 0.15T1 to about 0.25T1, from about 0.08T1 to about 0.24T1, from about 0.08T1 to about 0.23T1, from about 0.08T1 to about 0.22T1, from about 0.08T1 to about 0.21T1, from about 0.08T1 to about 0.2T1, from about 0.08T1 to about 0.19T1, from about 0.08T1 to about 0.18T1, from about 0.08T1 to about 0.17T1, from about 0.08T1 to about 0.16T1, or from about 0.08T1 to about 0.15T1. In some instances, the DOC may be about 20 µm or less. In one or more embodiments, the DOC may be about 40 µm or greater (e.g., from about 40 µm to about 300 µm, from about 50 µm to about 300 µm, from about 60 µm to about 300 µm, from about 70 µm to about 300 µm, from about 80 µm to about 300 µm, from about 90 µm to about 300 µm, from about 100 µm to about 300 µm, from about 110 µm to about 300 µm, from about 120 µm to about 300 µm, from about 140 µm to about 300 µm, from about 150 µm to about 300 µm, from about 40 µm to about 290 µm, from about 40 µm to about 280 µm, from about 40 µm to about 260 µm, from about 40 µm to about 250 µm, from about 40 µm to about 240 µm, from about 40 µm to about 230 µm, from about 40 µm to about 220 µm, from about 40 µm to about 210 µm, from about 40 µm to about 200 µm, from about 40 µm to about 180 µm, from about 40 µm to about 160 µm, from about 40 µm to about 150 µm, from about 40 µm to about 140 µm, from about 40 µm to about 130 µm, from about 40 µm to about 120 µm, from about 40 µm to about 110 µm, or from about 40 μm to about 100 μm. In other embodiments, DOC falls within any one of the exact numerical ranges set forth in this paragraph.

In one or more embodiments, the strengthened glass substrate may have a CS (which may be found at the surface or a depth within the glass substrate) of about 200 MPa or greater, 300 MPa or greater, 400 MPa or greater, about 500 MPa or greater, about 600 MPa or greater, about 700 MPa or greater, about 800 MPa or greater, about 900 MPa or greater, about 930 MPa or greater, about 1000 MPa or greater, or about 1050 MPa or greater.

In one or more embodiments, the strengthened glass substrate may have a maximum tensile stress or central tension (CT) of about 20 MPa or greater, about 30 MPa or greater, about 40 MPa or greater, about 45 MPa or greater, about 50 MPa or greater, about 60 MPa or greater, about 70 MPa or greater, about 75 MPa or greater, about 80 MPa or greater, or about 85 MPa or greater. In some embodiments, the maximum tensile stress or central tension (CT) may be in a range from about 40 MPa to about 100 MPa. In other embodiments, CS falls within the exact numerical ranges set forth in this paragraph.

Glass Compositions

Suitable glass compositions for use in glass substrate 134 include soda lime glass, aluminosilicate glass, borosilicate glass, boroaluminosilicate glass, alkali-containing aluminosilicate glass, alkali-containing borosilicate glass, and alkali-containing boroaluminosilicate glass.

Unless otherwise specified, the glass compositions disclosed herein are described in mole percent (mol %) as analyzed on an oxide basis.

In one or more embodiments, the glass composition may include $SiO_2$ in an amount in a range from about 66 mol % to about 80 mol %, from about 67 mol % to about 80 mol %, from about 68 mol % to about 80 mol %, from about 69 mol % to about 80 mol %, from about 70 mol % to about 80 mol %, from about 72 mol % to about 80 mol %, from about 65 mol % to about 78 mol %, from about 65 mol % to about 76 mol %, from about 65 mol % to about 75 mol %, from about 65 mol % to about 74 mol %, from about 65 mol % to about 72 mol %, or from about 65 mol % to about 70 mol %, and all ranges and sub-ranges therebetween.

In one or more embodiments, the glass composition includes $Al_2O_3$ in an amount greater than about 4 mol %, or greater than about 5 mol %. In one or more embodiments, the glass composition includes $Al_2O_3$ in a range from greater than about 7 mol % to about 15 mol %, from greater than about 7 mol % to about 14 mol %, from about 7 mol % to about 13 mol %, from about 4 mol % to about 12 mol %, from about 7 mol % to about 11 mol %, from about 8 mol % to about 15 mol %, from about 9 mol % to about 15 mol %, from about 10 mol % to about 15 mol %, from about 11 mol % to about 15 mol %, or from about 12 mol % to about 15 mol %, and all ranges and sub-ranges therebetween. In one or more embodiments, the upper limit of $Al_2O_3$ may be about 14 mol %, 14.2 mol %, 14.4 mol %, 14.6 mol %, or 14.8 mol %.

In one or more embodiments, the glass article is described as an aluminosilicate glass article or including an aluminosilicate glass composition. In such embodiments, the glass composition or article formed therefrom includes $SiO_2$ and $Al_2O_3$ and is not a soda lime silicate glass. In this regard, the glass composition or article formed therefrom includes $Al_2O_3$ in an amount of about 2 mol % or greater, 2.25 mol % or greater, 2.5 mol % or greater, about 2.75 mol % or greater, about 3 mol % or greater.

In one or more embodiments, the glass composition comprises $B_2O_3$ (e.g., about 0.01 mol % or greater). In one or more embodiments, the glass composition comprises $B_2O_3$ in an amount in a range from about 0 mol % to about 5 mol %, from about 0 mol % to about 4 mol %, from about 0 mol % to about 3 mol %, from about 0 mol % to about 2 mol %, from about 0 mol % to about 1 mol %, from about 0 mol % to about 0.5 mol %, from about 0.1 mol % to about 5 mol %, from about 0.1 mol % to about 4 mol %, from about 0.1 mol % to about 3 mol %, from about 0.1 mol % to about 2 mol %, from about 0.1 mol % to about 1 mol %, from about 0.1 mol % to about 0.5 mol %, and all ranges and sub-ranges therebetween. In one or more embodiments, the glass composition is substantially free of $B_2O_3$.

As used herein, the phrase "substantially free" with respect to the components of the composition means that the component is not actively or intentionally added to the composition during initial batching, but may be present as an impurity in an amount less than about 0.001 mol %.

In one or more embodiments, the glass composition optionally comprises $P_2O_5$ (e.g., about 0.01 mol % or greater). In one or more embodiments, the glass composition comprises a non-zero amount of $P_2O_5$ up to and including 2 mol %, 1.5 mol %, 1 mol %, or 0.5 mol %. In one or more embodiments, the glass composition is substantially free of $P_2O_5$.

In one or more embodiments, the glass composition may include a total amount of $R_2O$ (which is the total amount of alkali metal oxide such as $Li_2O$, $Na_2O$, $K_2O$, $Rb_2O$, and $Cs_2O$) that is greater than or equal to about 8 mol %, greater than or equal to about 10 mol %, or greater than or equal to about 12 mol %. In some embodiments, the glass composition includes a total amount of $R_2O$ in a range from about 8 mol % to about 20 mol %, from about 8 mol % to about 18 mol %, from about 8 mol % to about 16 mol %, from about 8 mol % to about 14 mol %, from about 8 mol % to about 12 mol %, from about 9 mol % to about 20 mol %, from about 10 mol % to about 20 mol %, from about 11 mol % to about 20 mol %, from about 12 mol % to about 20 mol %, from about 13 mol % to about 20 mol %, from about 10 mol % to about 14 mol %, or from 11 mol % to about 13 mol %, and all ranges and sub-ranges therebetween. In one or more embodiments, the glass composition may be substantially free of $Rb_2O$, $Cs_2O$ or both $Rb_2O$ and $Cs_2O$. In one or more embodiments, the $R_2O$ may include the total amount of $Li_2O$, $Na_2O$ and $K_2O$ only. In one or more embodiments, the glass composition may comprise at least one alkali metal oxide selected from $Li_2O$, $Na_2O$ and $K_2O$, wherein the alkali metal oxide is present in an amount greater than about 8 mol % or greater.

In one or more embodiments, the glass composition comprises $Na_2O$ in an amount greater than or equal to about 8 mol %, greater than or equal to about 10 mol %, or greater than or equal to about 12 mol %. In one or more embodiments, the composition includes $Na_2O$ in a range from about from about 8 mol % to about 20 mol %, from about 8 mol % to about 18 mol %, from about 8 mol % to about 16 mol %, from about 8 mol % to about 14 mol %, from about 8 mol % to about 12 mol %, from about 9 mol % to about 20 mol %, from about 10 mol % to about 20 mol %, from about 11 mol % to about 20 mol %, from about 12 mol % to about 20 mol %, from about 13 mol % to about 20 mol %, from about 10 mol % to about 14 mol %, or from 11 mol % to about 16 mol %, and all ranges and sub-ranges therebetween.

In one or more embodiments, the glass composition includes less than about 4 mol % $K_2O$, less than about 3 mol % $K_2O$, or less than about 1 mol % $K_2O$. In some instances, the glass composition may include K$_2$O in an amount in a range from about 0 mol % to about 4 mol %, from about 0 mol % to about 3.5 mol %, from about 0 mol % to about 3 mol %, from about 0 mol % to about 2.5 mol %, from about 0 mol % to about 2 mol %, from about 0 mol % to about 1.5 mol %, from about 0 mol % to about 1 mol %, from about 0 mol % to about 0.5 mol %, from about 0 mol % to about 0.2 mol %, from about 0 mol % to about 0.1 mol %, from about 0.5 mol % to about 4 mol %, from about 0.5 mol % to about 3.5 mol %, from about 0.5 mol % to about 3 mol %, from about 0.5 mol % to about 2.5 mol %, from about 0.5 mol % to about 2 mol %, from about 0.5 mol % to about 1.5 mol %, or from about 0.5 mol % to about 1 mol %, and all ranges and sub-ranges therebetween. In one or more embodiments, the glass composition may be substantially free of K$_2$O.

In one or more embodiments, the glass composition is substantially free of Li$_2$O.

In one or more embodiments, the amount of Na$_2$O in the composition may be greater than the amount of Li$_2$O. In some instances, the amount of Na$_2$O may be greater than the combined amount of Li$_2$O and K$_2$O. In one or more alternative embodiments, the amount of Li$_2$O in the composition may be greater than the amount of Na$_2$O or the combined amount of Na$_2$O and K$_2$O.

In one or more embodiments, the glass composition may include a total amount of RO (which is the total amount of alkaline earth metal oxide such as CaO, MgO, BaO, ZnO and SrO) in a range from about 0 mol % to about 2 mol %. In some embodiments, the glass composition includes a non-zero amount of RO up to about 2 mol %. In one or more embodiments, the glass composition comprises RO in an amount from about 0 mol % to about 1.8 mol %, from about 0 mol % to about 1.6 mol %, from about 0 mol % to about 1.5 mol %, from about 0 mol % to about 1.4 mol %, from about 0 mol % to about 1.2 mol %, from about 0 mol % to about 1 mol %, from about 0 mol % to about 0.8 mol %, from about 0 mol % to about 0.5 mol %, and all ranges and sub-ranges therebetween.

In one or more embodiments, the glass composition includes CaO in an amount less than about 1 mol %, less than about 0.8 mol %, or less than about 0.5 mol %. In one or more embodiments, the glass composition is substantially free of CaO.

In some embodiments, the glass composition comprises MgO in an amount from about 0 mol % to about 7 mol %, from about 0 mol % to about 6 mol %, from about 0 mol % to about 5 mol %, from about 0 mol % to about 4 mol %, from about 0.1 mol % to about 7 mol %, from about 0.1 mol % to about 6 mol %, from about 0.1 mol % to about 5 mol %, from about 0.1 mol % to about 4 mol %, from about 1 mol % to about 7 mol %, from about 2 mol % to about 6 mol %, or from about 3 mol % to about 6 mol %, and all ranges and sub-ranges therebetween.

In one or more embodiments, the glass composition comprises ZrO$_2$ in an amount equal to or less than about 0.2 mol %, less than about 0.18 mol %, less than about 0.16 mol %, less than about 0.15 mol %, less than about 0.14 mol %, less than about 0.12 mol %. In one or more embodiments, the glass composition comprises ZrO$_2$ in a range from about 0.01 mol % to about 0.2 mol %, from about 0.01 mol % to about 0.18 mol %, from about 0.01 mol % to about 0.16 mol %, from about 0.01 mol % to about 0.15 mol %, from about 0.01 mol % to about 0.14 mol %, from about 0.01 mol % to about 0.12 mol %, or from about 0.01 mol % to about 0.10 mol %, and all ranges and sub-ranges therebetween.

In one or more embodiments, the glass composition comprises SnO$_2$ in an amount equal to or less than about 0.2 mol %, less than about 0.18 mol %, less than about 0.16 mol %, less than about 0.15 mol %, less than about 0.14 mol %, less than about 0.12 mol %. In one or more embodiments, the glass composition comprises SnO$_2$ in a range from about 0.01 mol % to about 0.2 mol %, from about 0.01 mol % to about 0.18 mol %, from about 0.01 mol % to about 0.16 mol %, from about 0.01 mol % to about 0.15 mol %, from about 0.01 mol % to about 0.14 mol %, from about 0.01 mol % to about 0.12 mol %, or from about 0.01 mol % to about 0.10 mol %, and all ranges and sub-ranges therebetween.

In one or more embodiments, the glass composition may include an oxide that imparts a color or tint to the glass articles. In some embodiments, the glass composition includes an oxide that prevents discoloration of the glass article when the glass article is exposed to ultraviolet radiation. Examples of such oxides include, without limitation oxides of: Ti, V, Cr, Mn, Fe, Co, Ni, Cu, Ce, W, and Mo.

In one or more embodiments, the glass composition includes Fe expressed as Fe$_2$O$_3$, wherein Fe is present in an amount up to (and including) about 1 mol %. In some embodiments, the glass composition is substantially free of Fe. In one or more embodiments, the glass composition comprises Fe$_2$O$_3$ in an amount equal to or less than about 0.2 mol %, less than about 0.18 mol %, less than about 0.16 mol %, less than about 0.15 mol %, less than about 0.14 mol %, less than about 0.12 mol %. In one or more embodiments, the glass composition comprises Fe$_2$O$_3$ in a range from about 0.01 mol % to about 0.2 mol %, from about 0.01 mol % to about 0.18 mol %, from about 0.01 mol % to about 0.16 mol %, from about 0.01 mol % to about 0.15 mol %, from about 0.01 mol % to about 0.14 mol %, from about 0.01 mol % to about 0.12 mol %, or from about 0.01 mol % to about 0.10 mol %, and all ranges and sub-ranges therebetween.

Where the glass composition includes TiO$_2$, TiO$_2$ may be present in an amount of about 5 mol % or less, about 2.5 mol % or less, about 2 mol % or less or about 1 mol % or less. In one or more embodiments, the glass composition may be substantially free of TiO$_2$.

An exemplary glass composition includes SiO$_2$ in an amount in a range from about 65 mol % to about 75 mol %, Al$_2$O$_3$ in an amount in a range from about 8 mol % to about 14 mol %, Na$_2$O in an amount in a range from about 12 mol % to about 17 mol %, K$_2$O in an amount in a range of about 0 mol % to about 0.2 mol %, and MgO in an amount in a range from about 1.5 mol % to about 6 mol %. Optionally, SnO$_2$ may be included in the amounts otherwise disclosed herein. It should be understood, that while the preceding glass composition paragraphs express approximate ranges, in other embodiments, glass substrate 134 may be made from any glass composition falling with any one of the exact numerical ranges discussed above.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more than one component or element, and is not intended to be construed as meaning only one.

It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. A method of forming a vehicle interior system comprising:
supporting a glass substrate within a mold cavity of a mold, wherein the glass substrate has a first major surface, and a second major surface opposite the first major surface, and a minor surface extending between the first major surface and the second major surface, wherein the second major surface of the glass substrate faces a curved support surface within the mold; and
applying a force to the glass substrate causing the glass substrate to bend into conformity with a curved shape of the curved support surface such that a curved glass substrate is formed, wherein the first major surface of the curved glass substrate includes a curved section and the second major surface of the curved glass substrate includes a curved section;
after applying the force to the glass substrate, closing the mold cavity while the glass substrate is disposed in the mold cavity;
delivering a liquid polymer material to the mold cavity such that the liquid polymer material contacts the first major surface of the glass substrate;
solidifying the liquid polymer material within the mold cavity to form a polymer frame engaging the curved glass substrate; and
removing the frame and the curved glass substrate from the mold, wherein the engagement between the frame and the curved glass substrate maintains the curved glass substrate in the curved shape;
wherein a maximum temperature of the glass substrate during the supporting step, the applying step, the delivering step, the solidifying step and the removing step is less than a glass transition temperature of the glass substrate.

2. The method of claim 1, wherein the mold comprises a first mold body and a second mold body, wherein the mold cavity is defined between opposing surfaces of the first and second mold bodies, wherein the removing step comprises opening the first mold body from the second mold body, wherein the maximum temperature of the glass substrate is less than 400 degrees C.

3. The method of claim 2, wherein the curved support surface is one of the opposing surfaces of the first and second mold bodies, the method further comprising closing the first mold body and the second mold body around the glass substrate prior to the delivering step.

4. The method of claim 1, wherein the engagement between the frame and the curved glass substrate that maintains the curved glass substrate in the curved shape is a bond formed between the polymer material and the glass substrate during the solidifying step.

5. The method of claim 1, wherein the curved support surface is a convex curved surface, the curved section of the first major surface is a convex curved section and the curved section of the second major surface is a concave curved section.

6. The method of claim 5, wherein the first major surface includes a second curved section and the second major surface includes a second curved section, wherein the second curved section of the first major surface is a concave curved section and the second curved section of the second major surface is a convex curved section.

7. The method of claim 1, wherein the first major surface of the glass substrate is under a compressive stress, $CS_1$, and the second major surface is under a compressive stress, $CS_2$, wherein $CS_1$ is different than $CS_2$.

8. The method of claim 1, wherein the frame comprises any one of a center console, a dashboard, an instrument panel, an arm rest, a pillar, a seat back, a floor board, a headrest, a door panel, a steering wheel and a portion of a housing of a free-standing display.

9. The method of claim 1, wherein the vehicle is any one of an automobile, a sea craft, and an aircraft.

10. A method of forming a vehicle interior system comprising:
supporting a glass substrate within a mold cavity of a mold, wherein the glass substrate has a first major surface, and a second major surface opposite the first major surface, and a minor surface extending between the first major surface and the second major surface,
bending the glass substrate to a curved shape within the mold cavity such that a curved glass substrate is formed while a maximum temperature of the glass substrate is maintained below a glass transition temperature of the glass substrate;
after bending the glass substrate, closing the mold cavity while the glass substrate is disposed in the mold cavity;
delivering a liquid polymer material to the mold cavity such that the liquid polymer material contacts the first major surface of the glass substrate; and
solidifying the liquid polymer material within the mold cavity to form a polymer frame engaging the curved glass substrate, wherein the engagement between the frame and the curved glass substrate maintains the curved glass substrate in the curved shape.

11. The method of claim 10, wherein the mold comprises a first mold body and a second mold body, wherein the mold cavity is defined between opposing surfaces of the first and second mold bodies, wherein the maximum temperature of the glass substrate is less than 400 degrees C.

12. The method of claim 11, wherein the glass substrate is bent into conformity with one of the opposing surfaces of the first and second mold bodies, the method further comprising closing the first mold body and the second mold body around the glass substrate prior to the delivering step.

13. The method of claim 10, wherein the first major surface of the glass substrate is under a compressive stress, $CS_1$, and the second major surface is under a compressive stress, $CS_2$, wherein $CS_1$ is different than $CS_2$.

14. The method of claim 1, wherein solidifying the liquid polymer material comprises curing the liquid polymer material via cross-linking.

15. The method of claim 1, wherein the liquid polymer material comprises at least one of a polyethylene, a polypropylene, a polycarbonate-ABS, or a thermoplastic elastomer.

16. The method of claim 10, further comprising cooling the mold after delivering the liquid polymer material to the mold cavity to facilitate solidifying the liquid polymer material.

17. The method of claim 10, wherein solidifying the liquid polymer material comprises curing the liquid polymer material via cross-linking.

18. The method of claim 10, wherein the liquid polymer material comprises at least one of a polyethylene, a polypropylene, a polycarbonate-ABS, or a thermoplastic elastomer.

19. The method of claim 1, wherein the mold comprises a mold surface and wherein supporting the glass substrate within the mold cavity of the mold further comprises supporting the glass substrate on a support structure within the mold cavity separate from the mold surface, the support structure comprising the curved support surface.

20. The method of claim 10, wherein the mold comprises a mold surface and wherein supporting the glass substrate within the mold cavity of the mold further comprises supporting the glass substrate on a support structure within the mold cavity separate from the mold surface.

* * * * *

UNITED STATES PATENT AND TRADEMARK OFFICE
CERTIFICATE OF CORRECTION

| | |
|---|---|
| PATENT NO. | : 11,518,146 B2 |
| APPLICATION NO. | : 16/512657 |
| DATED | : December 6, 2022 |
| INVENTOR(S) | : Michael Timothy Brennan et al. |

It is certified that error appears in the above-identified patent and that said Letters Patent is hereby corrected as shown below:

On the Title Page

On the page 4, in Column 2, item (56) under "Foreign Patent Documents", Line 79, delete "SB" and insert -- GB --.

On the page 5, in Column 1, item (56) under "Foreign Patent Documents", Line 1, delete "SB" and insert -- GB --.

On the page 5, in Column 2, item (56) under "Other Publications", Line 22, delete "Coellicient"," and insert -- Coefficient", --.

On the page 5, in Column 2, item (56) under "Other Publications", Line 34, delete "atglasstec," and insert -- at glasstec, --.

On the page 6, in Column 2, item (56) under "Other Publications", Line 1, delete "Faade" and insert -- Façade --.

On the page 6, in Column 2, item (56) under "Other Publications", Line 2, delete "Faade"," and insert -- Façade", --.

On the page 6, in Column 2, item (56) under "Other Publications", Line 9, delete ""Pegaton" and insert -- "Pegatron --.

On the page 5, in Column 2, item (56) under "Other Publications", Line 18, delete ""NewWave" and insert -- "New Wave --.

Signed and Sealed this
Thirtieth Day of January, 2024

*Katherine Kelly Vidal*
Katherine Kelly Vidal
*Director of the United States Patent and Trademark Office*